United States Patent
Drasny et al.

(10) Patent No.: US 10,990,725 B2
(45) Date of Patent: *Apr. 27, 2021

(54) CLOCK-GATING PHASE ALGEBRA FOR CLOCK ANALYSIS

(71) Applicant: International Business Machines Corporation, Armonk, NY (US)

(72) Inventors: Gabor Drasny, Poughkeepsie, NY (US); Gavin B. Meil, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,186

(22) Filed: May 14, 2019

(65) Prior Publication Data
US 2019/0266302 A1 Aug. 29, 2019

Related U.S. Application Data

(63) Continuation of application No. 14/840,517, filed on Aug. 31, 2015, now Pat. No. 10,331,822, which is a
(Continued)

(51) Int. Cl.
*G06F 30/33* (2020.01)
*G06F 30/30* (2020.01)
(Continued)

(52) U.S. Cl.
CPC .............. *G06F 30/33* (2020.01); *G06F 30/30* (2020.01); *G06F 30/3312* (2020.01);
(Continued)

(58) Field of Classification Search
CPC ...... G06F 8/427; G06F 8/443; G06F 17/5022; G06F 17/5031; G06F 17/5045;
(Continued)

(56) References Cited

U.S. PATENT DOCUMENTS 5,210,700 A  5/1993  Tom
5,452,239 A  9/1995  Dai et al.
(Continued)

FOREIGN PATENT DOCUMENTS

WO  002080046  10/2002

OTHER PUBLICATIONS

"U.S. Appl. No. 11/547,532 FAI—OfficeAction Summary", dated Jun. 9, 2016, 9 pages.
(Continued)

*Primary Examiner* — Vuthe Siek
(74) *Attorney, Agent, or Firm* — Peter K. Suchecki

(57) ABSTRACT

A design tool can implement phase algebra based design evaluation to evaluate a circuit design with a compact representation of numerous waveforms without simulating the individual waveforms. The design tool can determine an input sequence of signal transition representations associated with an input net of a component in RTL circuit design, where each signal transition representation represents a nondeterministic transition from a previous signal state to possible signal state(s). Determining the input sequence of signal transition representations includes determining that the input sequence of signal transition representations indicates an input gated clock waveform. The design tool also can determine, based on the indicated component and on the input gated clock waveform, an output sequence of signal transition representations derived from the input sequence of signal transition. Determining the output sequence includes determining whether signal transition representation(s) of the output sequence indicate an output gated clock waveform.

16 Claims, 25 Drawing Sheets

Related U.S. Application Data continuation of application No. 14/547,820, filed on Nov. 19, 2014, now Pat. No. 10,515,164.

(60) Provisional application No. 61/912,345, filed on Dec. 5, 2013.

(51) Int. Cl.
*G06F 30/35* (2020.01)
*G06F 30/3312* (2020.01)
*G06F 30/396* (2020.01)
*G06F 111/04* (2020.01)
*G06F 119/12* (2020.01)
*G06F 8/41* (2018.01)

(52) U.S. Cl.
CPC ............. *G06F 30/35* (2020.01); *G06F 8/427* (2013.01); *G06F 8/443* (2013.01); *G06F 30/396* (2020.01); *G06F 2111/04* (2020.01); *G06F 2119/12* (2020.01)

(58) Field of Classification Search
CPC ............. G06F 17/5059; G06F 2111/04; G06F 2119/12; G06F 2217/06; G06F 2217/62; G06F 2217/84; G06F 30/30; G06F 30/33; G06F 30/3312; G06F 30/35; G06F 30/396; G06F 30/15; G06F 30/20; G06F 30/23; G06F 111/04; G06F 119/12; G06F 8/41; H01H 33/77; H01H 9/302
See application file for complete search history.

(56) References Cited

U.S. PATENT DOCUMENTS

| | | | |
|---|---|---|---|
| 5,835,380 A | 11/1998 | Roethig | |
| 5,862,149 A | 1/1999 | Carpenter et al. | |
| 6,083,269 A | 7/2000 | Graef et al. | |
| 6,175,946 B1 | 1/2001 | Ly et al. | |
| 6,377,094 B1 | 4/2002 | Carley | |
| 6,654,715 B1 | 11/2003 | Iwashita | |
| 6,952,825 B1 | 10/2005 | Cockx et al. | |
| 7,073,146 B2 | 7/2006 | Sarwary et al. | |
| 7,080,365 B2 | 7/2006 | Broughton et al. | |
| 7,089,518 B2 | 8/2006 | Bair et al. | |
| 7,106,115 B2 | 9/2006 | Carley et al. | |
| 7,107,557 B2 | 9/2006 | Iwanishi | |
| 7,124,342 B2 | 10/2006 | Wang et al. | |
| 7,139,988 B2 | 11/2006 | Chard et al. | |
| 7,181,706 B2 | 2/2007 | Greenberg et al. | |
| 7,243,322 B1 | 7/2007 | Ly et al. | |
| 7,251,794 B2 | 7/2007 | Blanco et al. | |
| 7,283,944 B2 | 10/2007 | Tsai et al. | |
| 7,299,436 B2 | 11/2007 | Chu et al. | |
| 7,333,926 B2 | 2/2008 | Schuppe | |
| 7,356,789 B2 | 4/2008 | Ly et al. | |
| 7,437,701 B1 | 10/2008 | Dutra et al. | |
| 7,454,728 B2 | 11/2008 | Ly et al. | |
| 7,478,346 B2 | 1/2009 | Hsu et al. | |
| 7,484,192 B2 | 1/2009 | Ja et al. | |
| 7,484,196 B2 | 1/2009 | Ja et al. | |
| 7,562,244 B2 | 7/2009 | Wielage | |
| 7,594,200 B2 | 9/2009 | Eisner et al. | |
| 7,627,844 B2 | 12/2009 | Rahmat et al. | |
| 7,877,717 B2 | 1/2011 | Chu et al. | |
| 7,882,473 B2 | 2/2011 | Baumgartner et al. | |
| 7,979,820 B1 | 7/2011 | Patzer et al. | |
| 7,996,827 B2 | 8/2011 | Vorbach et al. | |
| 8,069,024 B1 | 11/2011 | Croix | |
| 8,271,918 B2 | 9/2012 | Kwok et al. | |
| 8,352,235 B1 | 1/2013 | Lin et al. | |
| 8,407,636 B2 | 3/2013 | Iwashita | |
| 8,434,047 B1 | 4/2013 | Jiang et al. | |
| 8,438,516 B2 | 5/2013 | Ly et al. | |
| 8,438,517 B2 | 5/2013 | Appleton et al. | |
| 8,448,111 B2 | 5/2013 | Mneimneh et al. | |
| 8,533,541 B2 | 9/2013 | Iwashita | |
| 8,914,761 B2 | 12/2014 | Ly et al. | |
| 8,935,642 B1 | 1/2015 | Bhardwaj et al. | |
| 8,977,995 B1 | 3/2015 | Arora et al. | |
| 9,026,978 B1 | 5/2015 | Liu et al. | |
| 9,223,916 B2 | 12/2015 | Dilullo et al. | |
| 9,251,304 B2 | 2/2016 | Drasny et al. | |
| 9,798,844 B2 | 10/2017 | Drasny et al. | |
| 9,916,407 B2 | 3/2018 | Drasny et al. | |
| 10,216,881 B2 | 2/2019 | Drasny et al. | |
| 2002/0152060 A1 | 10/2002 | Tseng | |
| 2003/0192018 A1 | 10/2003 | Baumgartner et al. | |
| 2004/0060024 A1 | 3/2004 | Bednar et al. | |
| 2004/0078767 A1 | 4/2004 | Burks et al. | |
| 2005/0268269 A1 | 12/2005 | Coiley | |
| 2006/0022729 A1 | 2/2006 | Carley et al. | |
| 2007/0168893 A1 | 7/2007 | Watanabe et al. | |
| 2007/0174805 A1 | 7/2007 | Hsu et al. | |
| 2008/0072188 A1 | 3/2008 | Ja et al. | |
| 2009/0013307 A1 | 1/2009 | Raghavan et al. | |
| 2009/0055668 A1 | 2/2009 | Fernsler et al. | |
| 2009/0106183 A1 | 4/2009 | Estan et al. | |
| 2009/0112555 A1 | 4/2009 | Boerstler et al. | |
| 2009/0268628 A1 | 10/2009 | Hoe et al. | |
| 2009/0271167 A1 | 10/2009 | Zhu et al. | |
| 2010/0031209 A1 | 2/2010 | Luan et al. | |
| 2010/0146338 A1 | 6/2010 | Schalick et al. | |
| 2010/0199244 A1 | 8/2010 | Kwok et al. | |
| 2010/0235799 A1 | 9/2010 | Rice et al. | |
| 2011/0113392 A1 | 5/2011 | Subhra et al. | |
| 2011/0133806 A1 | 6/2011 | Subramani et al. | |
| 2011/0197172 A1 | 8/2011 | Yamamoto et al. | |
| 2011/0291769 A1 | 12/2011 | Burstein et al. | |
| 2013/0107651 A1* | 5/2013 | Singh | G11C 11/412 365/207 |
| 2013/0132760 A1 | 5/2013 | Talupuru et al. | |
| 2013/0246985 A1 | 9/2013 | Ly et al. | |
| 2013/0343441 A1 | 12/2013 | Alfieri | |
| 2015/0026654 A1 | 1/2015 | Kwok et al. | |
| 2015/0058818 A1 | 2/2015 | Srinivasan et al. | |
| 2015/0161309 A1 | 6/2015 | Drasny et al. | |
| 2015/0161310 A1 | 6/2015 | Drasny et al. | |
| 2015/0161311 A1 | 6/2015 | Drasny et al. | |
| 2015/0161312 A1 | 6/2015 | Drasny et al. | |
| 2015/0161313 A1 | 6/2015 | Dransy et al. | |
| 2015/0161315 A1 | 6/2015 | Meil | |
| 2015/0169816 A1 | 6/2015 | Drasny et al. | |
| 2015/0269296 A1 | 9/2015 | Drasny et al. | |
| 2015/0269299 A1 | 9/2015 | Drasny et al. | |
| 2015/0370939 A1 | 12/2015 | Drasny et al. | |
| 2015/0370940 A1 | 12/2015 | Drasny et al. | |
| 2016/0078162 A1 | 3/2016 | Drasny et al. | |
| 2016/0188760 A1 | 6/2016 | Drasny et al. | |
| 2016/0188785 A1 | 6/2016 | Drasny et al. | |
| 2018/0075178 A1 | 3/2018 | Drasny et al. | |
| 2018/0082003 A1 | 3/2018 | Drasny et al. | |
| 2018/0107776 A1 | 4/2018 | Drasny et al. | |

OTHER PUBLICATIONS

"U.S. Appl. No. 14/274,956 Ex Parte Quayle Action", dated Apr. 10, 2015, 6 pages.

"U.S. Appl. No. 14/327,658 Office Action", dated Apr. 3, 2015, 9 pages.

"U.S. Appl. No. 14/547,532 FAIIP PreInterview Communication", dated Mar. 22, 2016, 7 Pages.

"U.S. Appl. No. 14/547,532 Final Office Action", dated Oct. 26, 2016, 11 pages.

"U.S. Appl. No. 14/547,820 FAIIP—OA Summary", dated May 10, 2016, 10 pages.

"U.S. Appl. No. 14/547,820 Final Office Action", dated Oct. 10, 2017, 9 pages.

"U.S. Appl. No. 14/547,820 Final Office Action", dated Nov. 23, 2016, 9 pages.

"U.S. Appl. No. 14/547,820 Office Action", dated Apr. 26, 2017, 8 pages.

(56) References Cited

OTHER PUBLICATIONS

"U.S. Appl. No. 14/547,953 FAIIP—OA Summary", dated May 10, 2016, 12 pages.
"U.S. Appl. No. 14/547,953 Final Office Action", dated Oct. 24, 2017, 6 pages.
"U.S. Appl. No. 14/547,953 Final Office Action", dated Nov. 22, 2016, 9 pages.
"U.S. Appl. No. 14/547,953 Office Action", dated Apr. 20, 2017, 8 pages.
"U.S. Appl. No. 14/560,599 FAIIP PreInterview Communication", dated Apr. 13, 2016, 3 pages.
"U.S. Appl. No. 14/631,539 FAIIP PreInterview Communication", dated May 31, 2016, 24 pages.
"U.S. Appl. No. 14/631,539 FAI—OfficeAction Summary", dated Nov. 22, 2016, 7 pages.
"U.S. Appl. No. 14/631,539 Final Office Action", dated Jun. 1, 2017, 9 pages.
"U.S. Appl. No. 14/734,912 FAI—OfficeAction Summary", dated Nov. 10, 2016, 11 pages.
"U.S. Appl. No. 14/734,912 FAIIP PreInterview Communication", dated Aug. 29, 2016, 5 pages.
"U.S. Appl. No. 14/734,912 Final Office Action", dated Mar. 24, 2017, 14 pages.
"U.S. Appl. No. 14/840,372 FAI OA Summary", dated Feb. 15, 2017, 3 pages.
"U.S. Appl. No. 14/840,372 FAIIP PreInterview Communication", dated Oct. 20, 2016, 3 pages.
"U.S. Appl. No. 14/840,372 Final Office Action", dated May 18, 2017, 15 pages.
"U.S. Appl. No. 14/840,372 Final Office Action", dated May 31, 2018, 15 pages.
"U.S. Appl. No. 14/840,372 Office Action", dated Dec. 20, 2017, 8 pages.
"U.S. Appl. No. 14/840,517 FAIIP PreInterview Communication", dated Jul. 14, 2016, 5 pages.
"U.S. Appl. No. 14/840,517 Final Office Action", dated Apr. 2, 2018, 10 pages.
"U.S. Appl. No. 14/840,517 Final Office Action", dated Jun. 9, 2017, 9 pages.
"U.S. Appl. No. 14/840,517 Office Action", dated Jan. 18, 2017, 12 pages.
"U.S. Appl. No. 14/840,517 Office Action", dated Oct. 10, 2017, 10 pages.
"U.S. Appl. No. 14/840,774 FAI PreInterview Comm.", dated Oct. 18, 2016, 5 pages.
"U.S. Appl. No. 14/840,774 Final Office Action", dated Nov. 6, 2017, 7 pages.
"U.S. Appl. No. 14/840,774 Office Action", dated Apr. 18, 2017, 7 pages.
"U.S. Appl. No. 15/061,532 Final Office Action", dated Feb. 22, 2018, 14 pages.
"U.S. Appl. No. 15/061,532 First Action Interview—Pre Interview", dated Jul. 14, 2017, 5 pages.
"U.S. Appl. No. 15/061,532 Office Action", dated Jan. 3, 2019, 18 pages.
"U.S. Appl. No. 15/061,532 Office Action", dated Jun. 14, 2018, 10 pages.
"U.S. Appl. No. 15/061,601 Final Office Action", dated Mar. 26, 2018, 15 pages.
"U.S. Appl. No. 15/061,601 First Action Interview—Pre Interview", dated Jul. 17, 2017, 5 pages.
"U.S. Appl. No. 15/061,601 Office Action", dated Jul. 26, 2018, 11 pages.
"U.S. Appl. No. 15/791,082 Office Action", dated Apr. 20, 2018, 9 pages.
"U.S. Appl. No. 15/061,532 FAI Office Action Summary_dated Nov. 6, 2017", Nov. 6, 2017, 10 pages.
"U.S. Appl. No. 15/061,601 FAI Office Action Summary_dated Nov. 6, 2017", Nov. 6, 2017, 10 pages.
Chakrabarty, et al., "Synthesis of Transparent Circuits for Hierarchical and System-on-a-Chip Test", National Science Foundation under grant No. CCR-9875324. pp. 1-6., 2001, 6 pages.
Cummings, "Clock Domain Crossing (CDC) Design & Verification Techniques Using SystemVerilog", SNUG-2008, 2008, 56 pages.
Czeck, et al., "Reliable Design with Multiple Clock Domains", Conference: Formal Methods and Models for Co-Design, 2006. Memocode '06. Proceedings. Fourth ACM and IEEE International Conference on Source: IEEE Xplore, 2006, 10 pages.
Foulon, "CAD Flow for System on Chip", The 13th International Conference on Microelectronics Rabat, Morocco, pp. 241-244, Oct. 29-31, 2001, Oct. 2001, 4 pages.
Hari, et al., "Automatic Constraint Based Test Generation for Behavioral HDL Models", IEEE Transactions on Very Large Scale Integration (VLSI) Systems, Vol. 16, No. 4, pp. 408-421, Apr. 2008, Apr. 2008, 14 pages.
Litterick, "Pragmatic Simulation-Based Verification of Clock Domain Crossing Signals and Jitter using SystemVerilog Assertions", Verilab & DVCon ; https://www.verilab.com/files/sva_cdc_presentation_dvcon2006.pdf, 2006, 6 pages.
Narain, et al., "Clock Domain Crossing Demystified: The Second Generation Solution for CDC Verification", (Real Intent and Sunburst Design white paper), Mar. 13, 2008., 2008, 20 pages.
Suhaib, "Formal Methods for Intellectual Property Composition Across Synchronization Domains", Dissertation submitted to the Faculty of the Virginia Polytechnic Institute and State University, Aug. 29, 2007, 190 pages.
Ravi, et al., "TAO: Regular Expression-Based Register-Transfer Level Testability Analysis and Optimization", IEEE Transactions on Very Large Scale Integration (VLSI) Systems, vol. 9, No. 6, pp. 824-832, Dec. 2001, Dec. 2001, 9 pages.
Schubert, et al., "Solutions to IBM POWER8 Verification Challenges", IBM J. Res. & Dev., vol. 59, No. 1, Paper 11, Jan. 2015, pp. 11:1-11:17.
Seshadri, et al., "An Integrated Approach to Behavioral-Level Design-for-Testability Using Value-Range and Variable Testability Techniques", International Test Conference, 1999. pp. 858-867., 1999, 10 pages.
Singh, et al., "Generalized Latency-Insensitive Systems for Single-Clock and Multi-Clock Architectures", Design, Automation and Test in Europe Conference and Exhibition, 2004. Proceedings (vol. 2 ), Feb. 2004, pp. 1008-1013.
Srinivas, et al., "Formal Verification of Digital Circuits Using Hybrid Simulation", IEEE Circuits and Devices Magazine, pp. 19-27, January 1988., Jan. 1988, 9 pages.

* cited by examiner

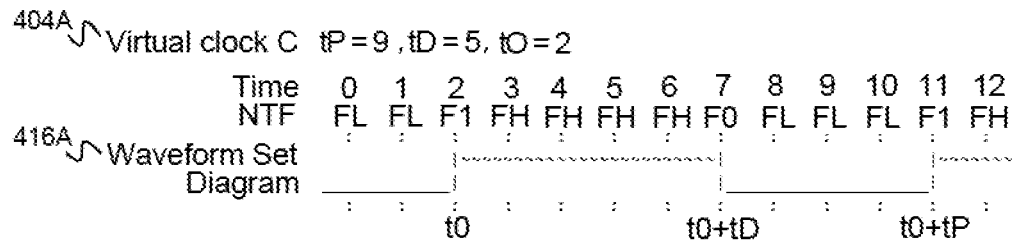
FIG. 4A
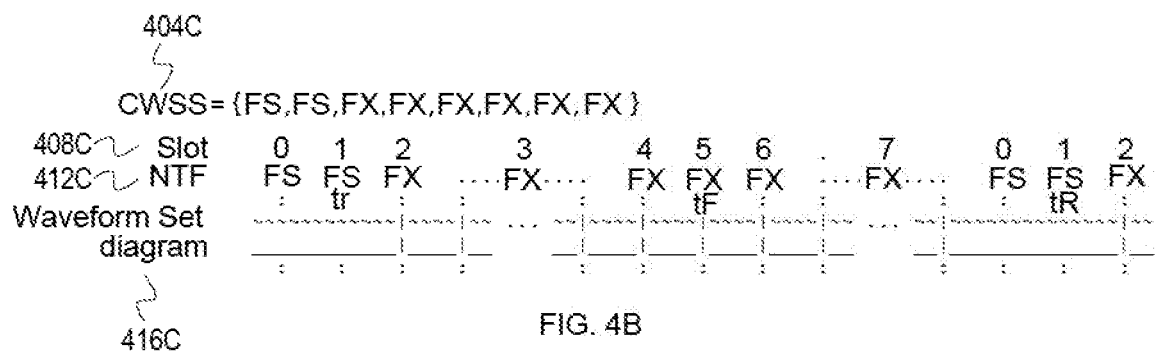
FIG. 4B
FIG. 4

| NTF Name | Function Table (x = don't care) | G-value | Symbol for Waveform Set Diagram at time t | | | | Description (signal behavior at time t) |
|---|---|---|---|---|---|---|---|
| | | | if follows F0 or FL at t-1 | if follows F1 or FH at t-1 | if follows FG at t-1 | if follows FN at t-1 | if follows FF, FR, FS or FX at t-1 | |
| F0 | input \| output<br>(xp, wp) \| SN<br>---------+---------<br>( x, x ) \| ( 0 ) | 0 | not allowed (use FL instead) | t<br>:<br>∞ \|<br>⌐ | t<br>:<br>∞ \|<br>⌐ | t<br>:<br>∞ \|<br>⌐ | t<br>:<br>∞ \|<br>⌐ | Signal is 0 (stable or falling edge). |
| F1 | input \| output<br>(xp, wp) \| SN<br>---------+---------<br>( x, x ) \| ( 1 ) | 0 | t<br>:<br>\|∞<br>⌐ | not allowed (use FH instead) | t<br>:<br>∞\|∞<br>⌐ | t<br>:<br>∞\|∞<br>⌐ | t<br>:<br>∞\|∞<br>⌐ | Signal is 1 (stable or rising edge). |
| FF | input \| output<br>(xp, wp) \| SN<br>---------+---------<br>( x, 0 ) \| ( 0 )<br>( x, 1 ) \| ( 0, 1 ) | 0 | not allowed (use FL instead) | t<br>:<br>∞\|∞<br>⌐ | t<br>:<br>∞\|∞<br>⌐<br>v | t<br>:<br>∞\|∞<br>⌐<br>v | t<br>:<br>∞\|∞<br>⌐<br>v | Signal is either stable or falling (nondeterministic). |
| FG | input \| output<br>(xp, wp) \| SN<br>---------+---------<br>( 0, x ) \| ( 0, 1 )<br>( 1, 0 ) \| ( 0 )<br>( 1, 1 ) \| ( 1 ) | 1 | t<br>\|←-<br>⌐ | t<br>∞\|←-<br>: | t<br>-›\|∞<br>:— | t<br>∞\|←-<br>⌐ | t<br>∞\|←-<br>⌐ | Signal may transition at most once within time range having contiguous range of FG (glitch-free) |
| FH | input \| output<br>(xp, wp) \| SN<br>---------+---------<br>( x, x ) \| ( 1 ) | 0 | not allowed (use F1 instead) | t<br>:<br>----- | not allowed (use F1 instead) | t<br>:<br>----- | not allowed (use F1 instead) | Signal is stable 1 (High). Although the transition function is identical to F1, the adjacency restriction implies there can be no transition. |
| FL | input \| output<br>(xp, wp) \| SN<br>---------+---------<br>( x, x ) \| ( 0 ) | 0 | t<br>:<br>----- | not allowed (use F0 instead) | not allowed (use F0 instead) | t<br>:<br>----- | not allowed (use F0 instead) | Signal is stable 0 (Low). Although the transition function is identical to F0, the adjacency restriction implies there can be no transition. |
| FN | input \| output<br>(xp, wp) \| SN<br>---------+---------<br>( x, x ) \| ( ) | 0 | t<br>:<br>..... | t<br>:<br>..... | t<br>:<br>..... | t<br>:<br>..... | t<br>:<br>..... | Signal is to be ignored. The NTF returns a Null (empty) set, meaning that no waveform can be in any set specified using this NTF. While this does not accurately describe a real signal, it is mathematically useful to define operators which ignore the contributions of an input. |
| FR | input \| output<br>(xp, wp) \| SN<br>---------+---------<br>( x, 0 ) \| ( 0, 1 )<br>( x, 1 ) \| ( 1 ) | 0 | t<br>:<br>\|∞<br>⌐ | not allowed (use FS instead) | t<br>:<br>∞\|∞<br>⌐ | t<br>:<br>∞\|∞<br>⌐ | t<br>:<br>∞\|∞<br>⌐ | Signal is either stable or rising (nondeterministic). |
| FS | input \| output<br>(xp, wp) \| SN<br>---------+---------<br>( x, 0 ) \| ( 0 )<br>( x, 1 ) \| ( 1 ) | 0 | not allowed (use F0 instead) | not allowed (use F1 instead) | t<br>:<br>----- | not allowed (use FN instead) | t<br>:<br>----- | Signal is Stable. It can be low or high, but there can be no transition. |
| FX | input \| output<br>(xp, wp) \| SN<br>---------+---------<br>( x, x ) \| ( 0, 1 ) | 0 | not allowed (use FS instead) | not allowed (use FF instead) | t<br>:<br>∞\|∞<br>⌐ | t<br>:<br>∞\|∞<br>⌐ | t<br>:<br>∞\|∞<br>⌐ | Signal is completely nondeterministic (stable, rising or falling). |

FIG. 17  Table 2: Nondeterministic Transition Functions

| Function Name | Prototype (Call Syntax) | Definition (Lookup Table) | Description |
|---|---|---|---|
| ntf_not | ntf_y = ntf_not (ntf_a) | ntf_a: F0 F1 FF FG FH FL FN FR FS FX <br> ntf_y: F1 F0 FR FG FL FH FN FF FS FX | Used to determine the set of waveforms produced by an inverter. |
| ntf_and | ntf_y = ntf_and (ntf_a, ntf_b) | input \| input ntf_b <br> ntf_a \| F0 F1 FF FG FH FL FN FR FS FX <br> --------+------------------------------- <br> F0 \| F0 F0 F0 F0 F0 FL F0 F0 F0 F0 <br> F1 \| F0 F1 FX FX F1 FL FN FR FR FX <br> FF \| F0 FX FF FG FF FL FF FG FF FX <br> FG \| F0 FX FX FX FG FL FG FX FG FX <br> FH \| F0 F1 FF FG FH FL FN FR FS FX <br> FL \| FL FL FL FL FL FL FL FL FL FL <br> FN \| F0 FN FF FG FN FL FN FR FN FX <br> FR \| F0 FR FX FX FR FL FR FR FR FX <br> FS \| F0 FR FF FG FS FL FN FR FS FX <br> FX \| F0 FX FX FX FX FL FX FX FX FX | Used to determine the set of waveforms produced by an AND gate. |
| ntf_xor | ntf_y = ntf_xor (ntf_a, ntf_b) | input \| input ntf_b <br> ntf_a \| F0 F1 FF FG FH FL FN FR FS FX <br> --------+------------------------------- <br> F0 \| F0 F1 FX FX F1 F0 F0 FX FX FX <br> F1 \| F1 F0 FX FX F0 F1 F1 FX FX FX <br> FF \| FX FX FX FX FR FF FF FG FX FX <br> FG \| FX FX FX FX FG FG FG FF FG FX <br> FH \| F1 F0 FR FG FL FH FN FF FS FX <br> FL \| F0 F1 FF FG FH FL FN FR FS FX <br> FN \| F0 F1 FF FG FN FN FN FR FN FX <br> FR \| FX FX FX FX FF FR FR FX FX FX <br> FS \| FX FX FX FG FS FS FN FR FS FX <br> FX \| FX FX FX FX FX FX FX FX FX FX | Used to determine the set of waveforms produced by an XOR (exclusive-OR) gate. |
| ntf_trans_latch | ntf_q = ntf_trans_latch (ntf_c, ntf_d) | input \| input ntf_d <br> ntf_c \| F0 F1 FF FG FH FL FN FR FS FX <br> --------+------------------------------- <br> F0 \| FS FS FS FS FS FS FS FS FS FS <br> F1 \| F0 F1 FX FX F1 F0 FN FX FX FX <br> FF \| FF FR FF FG FS FS FN FR FS FX <br> FG \| FX FX FX FX FX FX FN FX FX FX <br> FH \| F0 F1 FF FG FH FL FN FR FS FX <br> FL \| FS FS FS FS FS FS FS FS FS FS <br> FN \| FN FN FN FN FN FN FN FN FN FN <br> FR \| FF FR FX FX FR FF FN FX FX FX <br> FS \| FF FR FF FG FS FS FN FR FS FX <br> FX \| FX FX FX FX FX FX FN FX FX FX | Used to determine the set of waveforms produced by a zero-delay transparent latch. |
| ntf_trans_latch_const | ntf_q = ntf_trans_latch_const (ntf_c, ntf_d) | input \| input ntf_d <br> ntf_c \| F0 F1 FF FG FH FL FN FR FS FX <br> --------+------------------------------- <br> F0 \| na na na na FH FL na na FS na <br> F1 \| na na na na FH FL na na FS na <br> FF \| na na na na FH FL na na FS na <br> FG \| na na na na FH FL na na FS na <br> FH \| na na na na FH FL na na FS na <br> FL \| na na na na FH FL na na FS na <br> FN \| na na na na FN FN na na FN na <br> FR \| na na na na FH FL na na FS na <br> FS \| na na na na FH FL na na FS na <br> FX \| na na na na FH FL na na FS na | Used to determine the set of waveforms produced by a zero-delay transparent latch, assuming that its data input is constant. na means the given cell of the table should never be accessed. |

FIG. 18A   Table 3: NTF Operators

| Function Name | Prototype (Call Syntax) | Definition (Lookup Table) | Description |
|---|---|---|---|
| ntf_unit_delay_range | ntf_y = ntf_unit_delay_range (ntf_a, ntf_r) | *lookup table with ntf_a rows (F0, F1, FF, FG, FH, FL, FS, FR, FS, FX) and ntf_r columns* | Assume ntf_r is the NTF for a range of time (t1 through t2), except that if ntf_r = F0, the range is assumed to contain F0 followed by FL; and likewise, F1 means F1 followed by FH. Assume ntf_a is the NTF for time t1-1. This function returns a new NTF to represent the same time range following a unit delay (i.e., output of unit delay block (UDB)). na means the given cell of the table should never be accessed. |
| ntf_is_subset | bool_y = ntf_is_subset (ntf_a, ntf_b) | *lookup table of T/F values with ntf_a rows and ntf_b columns* | Used to determine if one set of waveforms is a subset of another set of waveforms. |
| ntf_fix_adjacent | ntf_y = ntf_fix_adjacent (ntf_a, ntf_b) | *lookup table with ntf_a rows and ntf_b columns* | Returns equivalent but valid value for ntf_b when it follows ntf_a in time. na means the given cell of the table should never be accessed. |

Table 3 (Cont.): NTF Operators

FIG. 18B

| Number | Symbol | Name | Waveform Set Diagram | CWSS | Group |
|---|---|---|---|---|---|
| 1 | <> | Null (ignore) | | {FN, FN, FN, FN, FN, FN, FN, FN} | GN |
| 2 | 0 | Constant zero | | {FL, FL, FL, FL, FL, FL, FL, FL} | G0 |
| 3 | 1 | Constant one | | {FH, FH, FH, FH, FH, FH, FH, FH} | G1 |
| 4 | ? | Unknown constant | | {FS, FS, FS, FS, FS, FS, FS, FS} | GS |
| 5 | C | Clock | | {FL, F1, FH, FH, FH, F0, FL, FL} | GCL |
| 6 | ~C | Inverted Clock | | {FH, F0, FL, FL, FL, F1, FH, FH} | GCT |
| 7 | C#1 | Delayed Clock | | {FL, FL, F1, FH, FH, FH, F0, FL} | GCL |
| 8 | ~C#1 | Delayed Inverted Clock | | {FH, FH, F0, FL, FL, FL, F1, FH} | GCT |
| 9 | C!1 | Pulsed Clock | | {FL, F1, F0, FL, FL, FL, FL, FL} | GCL |
| 10 | (~C)!1 | Pulsed Inverted Clock | | {FL, FL, FL, FL, FL, F1, F0, FL} | GCT |
| 11 | ~C!1 | Inverted Pulsed Clock | | {FH, F0, F1, FH, FH, FH, FH, FH} | GCI |
| 12 | ~(~C)!1 | Inverted Pulsed Inverted Clock | | {FH, FH, FH, FH, FH, F0, F1, FH} | GCI |
| 13 | C!E | Edge Clock | | {FL, F1, F0, FL, FL, F1, F0, FL} | GCE |
| 14 | ~C!E | Inverted Edge Clock | | {FH, F0, F1, FH, FH, F0, F1, FH} | GCI |

Table 6: Phase Types

FIG. 19A

| Number | Symbol | Name | Waveform Set Diagram | CWSS | Group |
|---|---|---|---|---|---|
| 15 | C%* | Low Gated Clock | | {FL, FR, FS, FS, FS, F0, FL, FL} | GGL |
| 16 | (~C)%* | Low Gated Inverted Clock | | {FS, F0, FL, FL, FL, FR, FS, FS} | GGT |
| 17 | C#1%* | Low Gated Delayed Clock | | {FL, FL, FR, FS, FS, FS, F0, FL} | GGL |
| 18 | (~C)#1%* | Low Gated Delayed Inverted | | {FS, FS, F0, FL, FL, FL, FR, FS} | GGT |
| 19 | C!1%* | Low Gated Pulsed Clock | | {FL, FR, F0, FL, FL, FL, FL, FL} | GGL |
| 20 | (~C)!1%* | Low Gated Pulsed Inverted | | {FL, FL, FL, FL, FL, FR, F0, FL} | GGT |
| 21 | (~C!1)%* | Low Gated Inverted Pulsed | | {FS, F0, FR, FS, FS, FS, FS, FS} | GGI |
| 22 | (~(~C)!1)%* | Low Gated Inverted Pulsed | | {FS, FS, FS, FS, FS, F0, FR, FS} | GGI |
| 23 | CE%* | Low Gated Edge Clock | | {FL, FR, F0, FL, FL, FR, F0, FL} | GGE |
| 24 | (~CE)%* | Low Gated Inverted Edge | | {FS, F0, FR, FS, FS, F0, FR, FS} | GGI |
| 25 | C%^ | High- Gated Clock | | {FS, F1, FH, FH, FH, FF, FS, FS} | GCL |
| 26 | (~C)%^ | High- Gated Inverted Clock | | {FH, FF, FS, FS, FS, F1, FH, FH} | GCT |
| 27 | C#1%^ | High- Gated Delayed Clock | | {FS, FS, F1, FH, FH, FH, FF, FS} | GCL |
| 28 | (~C)#1%^ | High- Gated Delayed Inverted | | {FH, FH, FF, FS, FS, FS, F1, FH} | GCT |

Table 6 (Cont.): Phase Types

FIG. 19B

| Number | Symbol | Name | Waveform Set Diagram | CWSS | Group |
|---|---|---|---|---|---|
| 29 | C!%^ | High-Gated Pulsed Clock | | {FS, F1, FF, FS, FS, FS, FS, FS} | GCL |
| 30 | (~C)!%^ | High-Gated Pulsed Inverted | | {FS, FS, FS, FS, FS, F1, FF, FS} | GCT |
| 31 | (~C!1)%^ | High-Gated Inverted Pulsed | | {FH, FF, F1, FH, FH, FH, FH, FH} | GCI |
| 32 | (~(~C)!1)%^ | High-Gated Inverted Pulsed | | {FH, FH, FH, FH, FH, FF, F1, FH} | GCI |
| 33 | C!E%^ | High-Gated Edge Clock | | {FS, F1, FF, FS, FS, F1, FF, FS} | GCE |
| 34 | (~C!E)%^ | High-Gated Inverted Edge | | {FH, FF, F1, FH, FH, FF, F1, FH} | GCI |
| 35 | C%? | Double-Gated Clock | | {FS, FR, FS, FS, FS, FF, FS, FS} | GGL |
| 36 | (~C)%? | Double-Gated Inverted Clock | | {FS, FF, FS, FS, FS, FR, FS, FS} | GGT |
| 37 | C#!%? | Double-Gated Delayed Clock | | {FS, FS, FR, FS, FS, FS, FF, FS} | GGL |
| 38 | (~C)#!%? | Double-Gated Delayed Inverted | | {FS, FS, FF, FS, FS, FS, FR, FS} | GGT |
| 39 | C!%? | Double-Gated Pulsed Clock | | {FS, FR, FF, FS, FS, FS, FS, FS} | GGL |
| 40 | (~C)!%? | Double-Gated Pulsed Inverted | | {FS, FS, FS, FS, FS, FR, FF, FS} | GGT |
| 41 | (~C!1)%? | Double-Gated Inverted Pulsed | | {FS, FF, FR, FS, FS, FS, FS, FS} | GGI |
| 42 | (~(~C)!1)%? | Double-Gated Inverted Pulsed | | {FS, FS, FS, FS, FS, FF, FR, FS} | GGI |

Table 6 (Cont.): Phase Types

FIG. 19C

| Number | Symbol | Name | Waveform Set Diagram | CWSS | Group |
|---|---|---|---|---|---|
| 43 | C!E%? | Double-Gated Edge Clock | | {FS, FR, FF, FS, FS, FR, FF, FS} | GGE |
| 44 | (~C!E)%? | Double-Gated Inverted Edge | | {FS, FF, FR, FS, FS, FF, FR, FS} | GGI |
| 45 | C@LPGF | Latched Leading Phase Glitch- | | {FS, FS, FG, FG, FG, FG, FS, FS} | GLL |
| 46 | C@LGF | Latched Leading Glitch-Free | | {FS, FS, FG, FG, FG, FG, FG, FG} | GLL |
| 47 | C@LP | Latched Leading Phase | | {FS, FS, FX, FX, FX, FX, FS, FS} | GLL |
| 48 | C@L | Latched Leading | | {FS, FS, FX, FX, FX, FX, FX, FX} | GLL |
| 49 | C@TPGF | Latched Trailing Phase Glitch- | | {FG, FG, FS, FS, FS, FS, FG, FG} | GLT |
| 50 | C@TGF | Latched Trailing Glitch-Free | | {FG, FG, FG, FG, FS, FS, FG, FG} | GLT |
| 51 | C@TP | Latched Trailing Phase | | {FX, FX, FS, FS, FS, FS, FX, FX} | GLT |
| 52 | C@T | Latched Trailing | | {FX, FX, FX, FX, FS, FS, FX, FX} | GLT |
| 53 | C@E | Latched by any Edge | | {FX, FX, FX, FX, FX, FX, FX, FX} | GLE |
| 54 | * | All waveforms | | {FX, FX, FX, FX, FX, FX, FX, FX} | GA |
| 55 | ~ | Unknown (default) | | {FX, FX, FX, FX, FX, FX, FX, FX} | GU |

Table 6 (Cont.): Phase Types

FIG. 19D

Table 9: Phase Type Group Operators

FIG. 20

CLOCK-GATING PHASE ALGEBRA FOR CLOCK ANALYSIS

RELATED APPLICATIONS

This application is a Continuation of and claims the priority benefit of U.S. patent application Ser. No. 14/840,517, filed on Aug. 31, 2015, entitled "CLOCK-GATING PHASE ALGEBRA FOR CLOCK ANALYSIS", which claims the priority benefit of U.S. patent application Ser. No. 14/547,820, filed on Nov. 19, 2014, entitled "CLOCK-GATING PHASE ALGEBRA FOR CLOCK ANALYSIS," which claims priority from a U.S. Provisional Patent Application, Ser. No. 61/912,345, filed on Dec. 5, 2013, entitled "DETECTION OF CLOCK DOMAIN CROSSINGS AND POTENTIAL DEFECTS IN A CIRCUIT DESIGN AT THE REGISTER TRANSFER LEVEL," which is incorporated herein by reference. This application is also related to a U.S. patent application Ser. No. 14/327,658, filed on Jul. 10, 2014, entitled "CIRCUIT DESIGN EVALUATION WITH COMPACT MULTIWAVEFORM REPRESENTATIONS," which is incorporated herein by reference.

BACKGROUND

Embodiments of the inventive subject matter generally relate to the field of circuit design, and, more particularly, to electronic design automation (EDA) tools to identify potential defects in a register transfer level (RTL) design of a chip or a system on a chip.

EDA tools are used to evaluate chip designs prior to fabrication. The EDA process broadly consists of two steps. The first step is a check of the RTL design logic. The second step is a creation of a physical circuit design from the RTL design. The first step, checking the design logic, can be referred to as RTL design checking. In RTL design checking, a language such as VHDL (Very High Speed Integrated Circuit Hardware Descriptive Language) or Verilog can be used to describe and model the functional behavior of a circuit. RTL design checking itself can be decomposed into two steps. The first step is static checking and the second step is verification, also commonly referred to as a dynamic checking. In static checking, the structure of the design is analyzed without simulating the behavior of the design. Conversely, in verification, the design is simulated by applying test patterns or stimulus to the inputs of the design in an attempt to exhaustively identify possible errors. Verification can be an expensive process for a complex chip or system on a chip. Verification can also be inconclusive, since it is often infeasible to apply all possible test patterns to the inputs of a complex design.

Chips and systems on chips continue to increase in complexity, comprising many systems and sub-systems. These systems and sub-systems might comprise multiple clock domains. A clock domain is a set of sequential logic elements, such as transparent latches and flip-flops, and combinational logic associated with these sequential logic elements that are clocked by a common clock or by clocks having common frequency and a fixed phase relationship. A clock signal causes a change in the state of sequential logic, such as a flip-flop or transparent latch. An asynchronous clock domain crossing is a path from a sequential logic element or other source of state transitions in a design in a first clock domain to a sequential element in a second clock domain through which transitions may occur when the first clock domain operates asynchronously with respect to the second clock domain. When a data signal crosses from a first clock domain to a second clock domain and the first clock domain is asynchronous to the second clock domain, the crossing is referred to as an asynchronous clock domain crossing.

SUMMARY

Embodiments of the inventive subject matter include determining a sequence of signal transition representations associated with an input net of an indicated component in a register transfer level circuit design. Each signal transition representation of the sequence of signal transition representations represents a non-deterministic transition from a previous signal state to a set of one or more possible signal states. Determining the sequence of signal transition representations associated with the input net comprises determining that the sequence of signal transition representations indicates an input gated clock waveform. An output sequence of signal transition representations derived from the sequence of signal transition representations associated with the input net is determined based on the indicated component and on the input gated clock waveform. Determining the output sequence of signal transition representations comprises determining whether at least one of signal transition representations of the output sequence of signal transition representations indicates an output gated clock waveform.

BRIEF DESCRIPTION OF THE DRAWINGS

The present embodiments may be better understood, and numerous objects, features, and advantages made apparent to those skilled in the art by referencing the accompanying drawings.

FIGS. 4A-4B depict example NTF sequences and the information encoded in the sequences.

FIG. 17 depicts a table (Table 2) of Nondeterministic Transition Functions.

FIGS. 18A-18B depict a table (Table 3) of NTF Operators.

FIGS. 19A-19D depict a table (Table 6) of Phase Types.

FIG. 20 depicts a table (Table 9) of Phase Type Group Operators.

DESCRIPTION OF EMBODIMENT(S)

The description that follows includes example systems, methods, techniques, instruction sequences and computer program products that embody techniques of the present disclosure. However, it is understood that the described embodiments may be practiced without these specific details. For instance, the syntax employed to implement the disclosure can be varied. Additionally, although illustrations refer to a flip-flop as a fundamental circuit component, embodiments need not include a flip-flop. For example, a circuit model can include transparent latches and an inverter instead of a flip-flop as fundamental circuit components. Additionally, embodiments may implement fewer operations than the operations described herein, while other embodiments might be implemented with more operations that the ones described herein. In other instances, well-known instruction instances, protocols, structures and techniques have not been shown in detail in order not to obfuscate the description.

Modern processors or systems on a chip include multiple components. Identifying as many design defects as possible at the static checking phase of an RTL design check increases the efficiency of the verification process, thereby saving time and money. A design tool can implement phase algebra based design evaluation as described herein to efficiently evaluate a circuit design with a compact representation of numerous waveforms without simulating the individual waveforms. Instead of individual waveforms, the phase algebra based design evaluation employs compact representations of a group or set of waveforms.

Phase algebra based evaluation constructs representations of a set of waveforms based on relationships among a devised set of functions that account for the various states of a signal over time, including transitions and glitches. A memorized-transition function, referred to herein as an M-function, indicates signal transitions over time. The output value of the M-function indicates that a transition is occurring/has occurred (e.g., indicated with a value of 1), or no transition has occurred (e.g., indicated with a value of 0) with respect to a given time interval. The M-function can also indicate (e.g., with the value of 0) that the given time interval is outside a range of interest.

Figure 2:
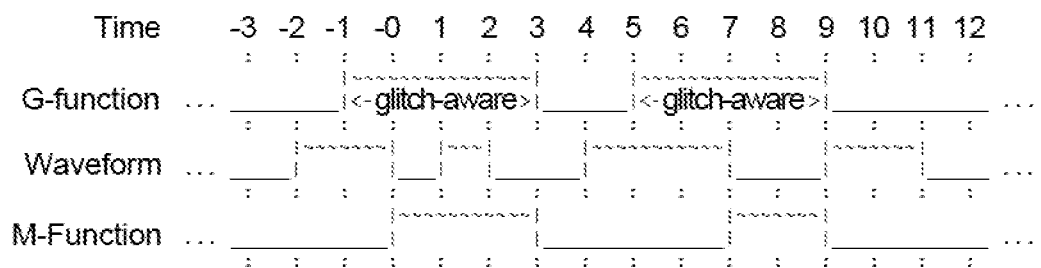
FIG. 2 illustrates the relationships among the G-function, a waveform, and the M-function.

A glitch aware function, referred to herein as a G-function, accounts for the occurrence of a glitch. A glitch can be characterized as a temporary deviation of a signal from its functional value. In general, a glitch occurs due to delays in inputs to a circuit component, delay inherent in a circuit component changing its output to reflect changes to its input, or both. For example, consider a first input and a second input to an AND gate. Assume that the first input at time t=1 is expected to transition to a 1 and the second input at time t=1 is expected to transition to a 0. However, if the second input is delayed, such that at time t=1, the second input is a 1 rather than a 0, then the output of the AND gate will be a 1 rather than a 0 as anticipated. The G-function assumes a value of 1 for all times during which there is interest in determining whether a glitch can occur. The relationships among these functions are depicted in FIG. 2 later.

The glitch aware algebra distinguishes between signals that are glitch-free and signals that are glitch-prone. Thus, the evaluation tool can identify some compact multi-waveform representations as being glitch-free or as being glitch-prone. If the glitch aware algebra is being employed, the evaluation tool will propagate compact multi-waveform representations on nets throughout a design representation using look up tables that are constructed based on a set of possible waveform states, and both the M-function and the G-function. The glitch aware algebra can use additional elements of these look up tables, as described herein. For example, the glitch aware algebra can utilize a path delay block (PDB) of Table 1, as well as additional elements of various other look-up tables described herein.

Furthermore, clock-gating algebra identifies signals that combine data and clock signals to generate clocks that can be turned off, or that can be forced on at certain times. The clock gating algebra also distinguishes among gated clocks that are gated low, high, or both. Thus, the evaluation tool can identify some compact multi-waveform representations as being of an ungated clock type or as gated clock type, and also distinguish between different types of a gated clock type of a compact multi-waveform representation. Clock gating typically refers to a type of digital logic that combines data and clock signals to generate clocks which can be turned off or forced on at certain times. A low-gated clock is a clock that is low when gated. A high-gated clock is a clock that is high when gated. A double-gated clock is a clock which can be either low or high when gated.

Figure 1:
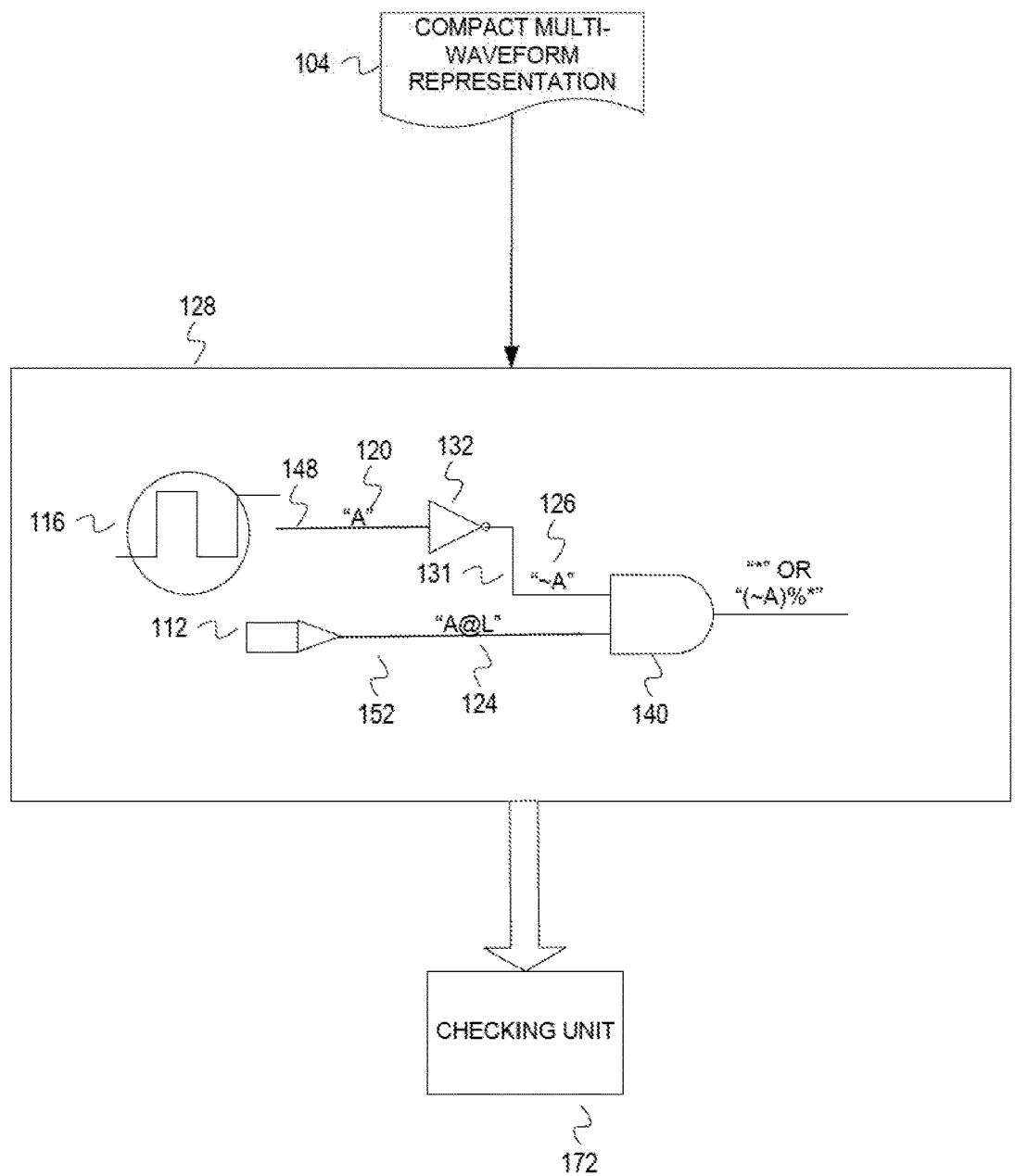
FIG. 1 is a conceptual diagram that depicts example phase algebra based circuit design evaluation with a compact multi-waveform representation.

FIG. 1 is a conceptual diagram that depicts example phase algebra based circuit design evaluation with a compact multi-waveform representation. A design tool performs phase algebra based circuit design evaluation on a machine readable representation of an RTL circuit design 128. The RTL circuit design representation 128 at least includes a primary input 112 and a clock generator 116. A primary input 112 is an input to the circuit itself. A primary input 112 is not driven by any component within the circuit. The clock generator 116 represents a clock signal that is provided to the circuit.

Table 1 below depicts example RTL circuit design components that can be modeled in an RTL circuit design evaluated by a phase algebra based evaluation tool (also referred to herein as an evaluation tool). In some embodiments, both the glitch aware algebra and the clock gating algebra can utilize a path delay block (PDB) of Table 1.

TABLE 1

Example RTL Circuit Design Components

| Component | Symbol | Output Behavior (at time t, as function of input(s)) | Comments |
| --- | --- | --- | --- |
| buffer | A—▷—Y | $Y(t) = A(t)$ | |
| inverter | A—▷o—Y | $Y(t) = \text{not}(A(t))$ | |
| 2-way AND | A, B —⊃—Y | $Y(t) = \text{and}(A(t), B(t))$ | |
| 2-way OR | A, B —⊃—Y | $Y(t) = \text{or}(A(t), B(t))$ | |
| 2-way XOR | A, B —⊃—Y | $Y(t) = \text{xor}(A(t), B(t))$ | Although XOR (exclusive-OR) can be modeled using AND gates and inverters, having a separate component allows more precise waveform calculations. |
| latch | D—[D Q]—Q, C—[LAT C] | $Q(t) = D(t-1)$ if $C(t-1) == 1$ else $Y(t-1)$ | The latch samples when the clock is high. There is a unit delay from any change on an input to a change on the output. |
| flip-flop | D—[D Q]—Q, C—[FF C] | $Q(t) = D(t-1)$ if $C(t-1) == 1$ and $C(t-2) == 0$ else $Y(t-1)$ | The flip-flop samples when the clock transitions high. There is a unit delay from any change on an input to a change on the output. |
| unit delay block | A—[UDB]—Y | $Y(t) = A(t-1)$ | The unit delay block (UDB) represents a short (unit) delay. It may be used, for example, to create a pulsed (chopped) clock from a nonpulsed clock. |
| path delay block | A—[PDB]—Y | $Y(t) = A(t-n)$, $0 \leq n \leq N$; where N is an unknown upper bound | The path delay block (PDB) represents a combinational path delay, which is typically not known in an RTL model, but is assumed to have some upper bound determined by static timing analysis. An embodiment of this invention can insert this component into the RTL model to model such delays. For example, inserting if on the input side of an AND gate models the fact that AND gate inputs can arrive at different times, causing glitches. |
| primary input | ⊐—Y | $Y(t) = \text{unknown}$ | This represents an input to the circuit being checked. |
| primary output | A—⊏ | | This represents an output to the circuit being checked. |
| clock generator | (⎍⎍)—Y | Y oscillates periodically between 0 and 1. | This represents a clock source within the verification model. Alternatively, clocks can be sourced by primary inputs to the model |
| random box | [RANDOM]—Y | $Y(t) = \text{random}$ | This would only appear in a verification model, not an actual circuit. It generates a random zero or one at each unit of time. Verification tools typically use a component like this to model nondeterminism. |
| assert box | A—[ASSERT] | | This would only appear in a verification model, not an actual circuit. It represents a property to be verified; specifically, that the input is always equal to 1. The verification process must attempt to find any situation in which an assert box input is not one, and if found, report if to the user as a property violation. |
| cover box | A—[COVER] | | This would only appear in a verification model, not an actual circuit. It represent a condition to be exercised by a simulation. The verification process must attempt to find one or more situations in which a cover box input is one, and if found, report them to the user as coverage events. |

A compact multi-waveform representation 104 is provided for the RTL circuit design 108. For example, the multi-waveform representation 104 is provided in a RTL description using attributes or in a file supplied as input to the evaluation tool. The evaluation tool determines compact multi-waveform representations generated on nets throughout the RTL circuit design dependent upon the components traversed by the compact multi-waveform representations. Example notations "A" 120 and "A@L" 124 for compact multi-waveform representations are depicted. These notations are referred to as "phase tags" herein. This example uses this phase tag to illustrate handling of a virtual clock identified as 'A'.

In this description, a phase tag and a phase type are distinguished. A phase type is a construct (e.g., variable or notation) that represents a generic virtual clock. Use of a phase type would be sufficient in a design that contemplates a single virtual clock. A phase tag is a construct that identifies a virtual clock. Although a phase tag can be used in a design that contemplates a single virtual clock, the utility of the phase tag becomes apparent when multiple virtual clocks are being considered. In addition, operators associated with phase tags ("phase tag operators") can manipulate results of phase type operators as appropriate for multiple virtual clocks. The particular terminology used to distinguish these constructs should not be used to limit claim scope. For this illustration, the notation "A" represents a set of signals or waveforms with a clock signal behavior corresponding to a virtual clock A. The notation "A@L" represents a set of signals or waveforms corresponding to a latch clocked by the leading edge of the virtual clock identified as A. The tables for phase types use the notation 'C' as a general identifier of any virtual clock. The majority of this description focuses on use of phase types and phase type operators.

The circuit design representation 128 also includes an inverter 132 and an AND gate 140. A net 148 is graphically depicted as connecting output of the clock generator 116 to input into the inverter 132. A net 131 is graphically depicted connecting output of the inverter 132 to a first input of the AND gate 140. A net 152 is graphically depicted as connecting output of the primary input element 112 to a second input of the AND gate 140. The evaluation tool determines that inputting the compact multi-waveform representation noted by the notation 120 into the inverter 132 will yield a compact multi-waveform representation with a notation "~A" 126, which represents a set of signals or waveforms with an inverted clock signal behavior. The evaluation tool determines that inputting the compact multi-waveform representation noted by the notation 124 and the compact multi-waveform representation noted with the notation 126 into the AND gate 140 will yield a compact multi-waveform representation with a notation "*" with the basic phase algebra since the basic phase algebra does not have values defined to handle a gated clock. The notation "*" represents all sets of waveforms.

If the clock gating algebra is being employed, then the notation yielded would be"(~A) %*" 126. The notation (~A) %* represents a set of waveforms characterized as a low-gated inverted clock. The evaluation tool propagates compact multi-waveform representations throughout nets of the circuit design representation 128 using look up tables constructed based, at least in part, on a set of possible waveform states. The clock gating algebra can use the elements of the glitch aware algebra (i.e., such as the PDB and other elements of the look up tables), as well as additional elements of various other lookup tables.

When compact multi-waveform representations have been determined, a checking unit 172 of the evaluation tool analyzes the compact multi-waveform representations associated with the nets of the design representation 128. The checking unit 172 can identify defects in the design using these compact multi-waveform representations.

For example, the checking unit 172 will evaluate the transition behavior represented by a compact multi-waveform representation associated with a net against a rule or constraint of the net. The rule or constraint of the net can be explicit (e.g., directly defined in associated with the net) or implicit (e.g., indirectly associated with the net via a characteristic of the net or at least one of the sinks of the net).

Referring back to Table 1, the first column of Table 1 includes common names for the example components and the second column of Table 1 includes symbols that commonly represent the example circuit components. The third column of Table 1 indicates the relationships between inputs to the circuit components and the outputs that the circuit components generate based on the inputs furnished to the circuit components. The transparent latch of row six of Table 1 is an example circuit component. Row six, column three of Table 1 specifies the relationship between the inputs to the transparent latch and the output that the transparent latch generates. The transparent latch takes two inputs: a data signal, represented by D, and a clock signal, represented by C. The clock signal can be generated by a clock generator, listed in row 12 of Table 1 or other harmonic oscillator. The transparent latch samples the data signal D when the clock signal equals 1. Thus, the output Q of the transparent latch at time t, denoted Q(t), equals the data value D at time t−1, denoted D(t−1), when the clock at time t−1 takes a value of 1, denoted C(t−1)=1. Otherwise, the output Q of the transparent latch does not change. In another embodiment, the transparent latch samples the data signal D at all times during which the clock signal assumes a value of 0 rather than a value of 1.

The flip-flop, shown in row seven of Table 1, is another circuit component. Like the transparent latch, the flip-flop receives two inputs, a data signal D and a clock signal C. The output Q of the flip-flop equals the value of the data signal. The flip-flop samples the data signal only during a small interval of time when the clock signal transitions from a 0 to a 1, unlike the transparent latch, which continuously samples the data signal when the clock signal equals a 1. Thus, if the data signal at the time at which the clock transitions from a 0 to a 1 is a 0, then the output of the flip-flop will become a 0. Otherwise, if the data signal at the time at which the clock transitions from a 0 to a 1 is a 1, then the output of the flip-flop will become a 1. Column three of Table 1 specifies this relationship. The output of the flip-flop Q(t) at time t equals the value of the data signal at time t−1, denoted D(t−1), if the clock signal at time t−1 denoted C(t−1)=1, and the clock signal at time t−2, denoted C(t−2)=0, thereby signifying a transition in the clock signal from a 0 to a 1. The flip-flop can be modeled by two transparent latches. The transparent latch and flip-flop each are modeled to include a unit delay such that the transparent latch and flip-flop express the output shown in column three of Table 1 after a unit has elapsed from the time of receipt of an input that causes a change in state of the output.

The combinational logic components shown in Table 1, such as the AND gates shown in row three, are modeled to have no delay between the time that the component receives an input and the time that the component generates an output based on the received input. However, a combinational logic circuit component will likely show a delay between receiving an input and generating an output. To model such a delay, a path delay block (PDB) can be implemented. A PDB (row nine in Table 1) represents a nondeterministic, bounded delay on the time necessary for a combinational circuit component to generate an output based on received inputs. The foregoing timing assumptions associated with the circuit components avoid modeling physical time, and allow modeling abstract time. This conserves computational resources.

Figure 3:
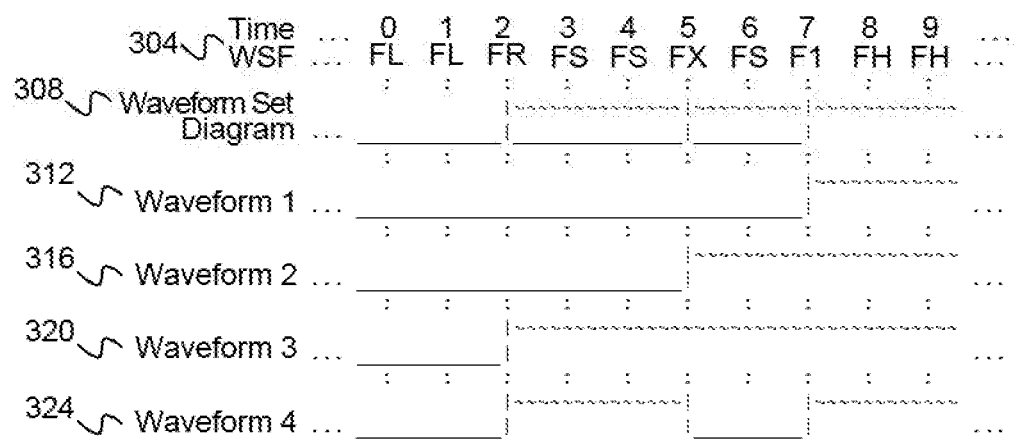
FIG. 3 depicts an example conceptual mapping of transitions in multiple waveforms to NTFs.

FIG. 2 illustrates the relationships among the G-function, a waveform, and the M-function. The relationship between the G-function (g(t)), the M-function (m(t)), and a waveform (w(t)) is given by the following expressions: if g(t)=0, then m(t)=0; otherwise, if g(t)=1, then m(t)=1 if and only if w(t) does not equal w(t−1) or m(t−1)=1, where g(t) is the value of the G-function at time t, m(t) is the value of the M-function at time t, and w(t) is the value of a waveform at time t. As depicted, the conditions for an M-function to equal 1 are that w(t) does not equal w(t−1), or that m(t−1) equals one. These conditions correspond to transitions in the modeled waveform w(t). With the M-function and the G-function, the previous state of a signal can be related to multiple possible next states of the signal with a compact representation. Each of these relationships is referred to herein as a nondeterministic transition function ("NTF"). FIG. 3 provides a diagram to help illustrate how a sequence of NTFs can represent multiple waveforms in a compact manner. The term "nondeterministic" implies that zero or one transitions can occur in a given NTF, as defined by the Function Table of Table 2 (shown in FIG. 17).

FIG. 3 depicts an example conceptual mapping of transitions in multiple waveforms to NTFs. The mapping of time to NTFs is referred to as a waveform set function (WSF). A WSF 304 specifies a set of waveforms 312, 316, 320, and 324. Each of the waveforms 312, 316, 320, and 324 assumes a value of either a 0 or a 1 at each instant of time. For example, waveform 312 assumes a value of 0 at all times before time t=0, and at times t=0 through t=6, but transitions to a 1 at time t=7 and assumes a value of 1 between times t=7 and t=9, and at all times after time t=9. These waveforms can be grouped together to form a single waveform set (compact multi-waveform), depicted by a waveform set diagram 308. The waveform set diagram 308 encodes information about the aggregate behavior of the waveforms 312, 316, 320, and 324. Associated with the waveform set diagram 308 is a waveform set function (WSF) 304. The WSF 304 maps each unit of time to an NTF. Each NTF relates a previous state of a waveform or set of waveforms to a set of possible next states. Although separated by a few layers of constructs, the compact multi-waveform representations mentioned earlier are based upon sequences of these NTFs.

Figure 5:
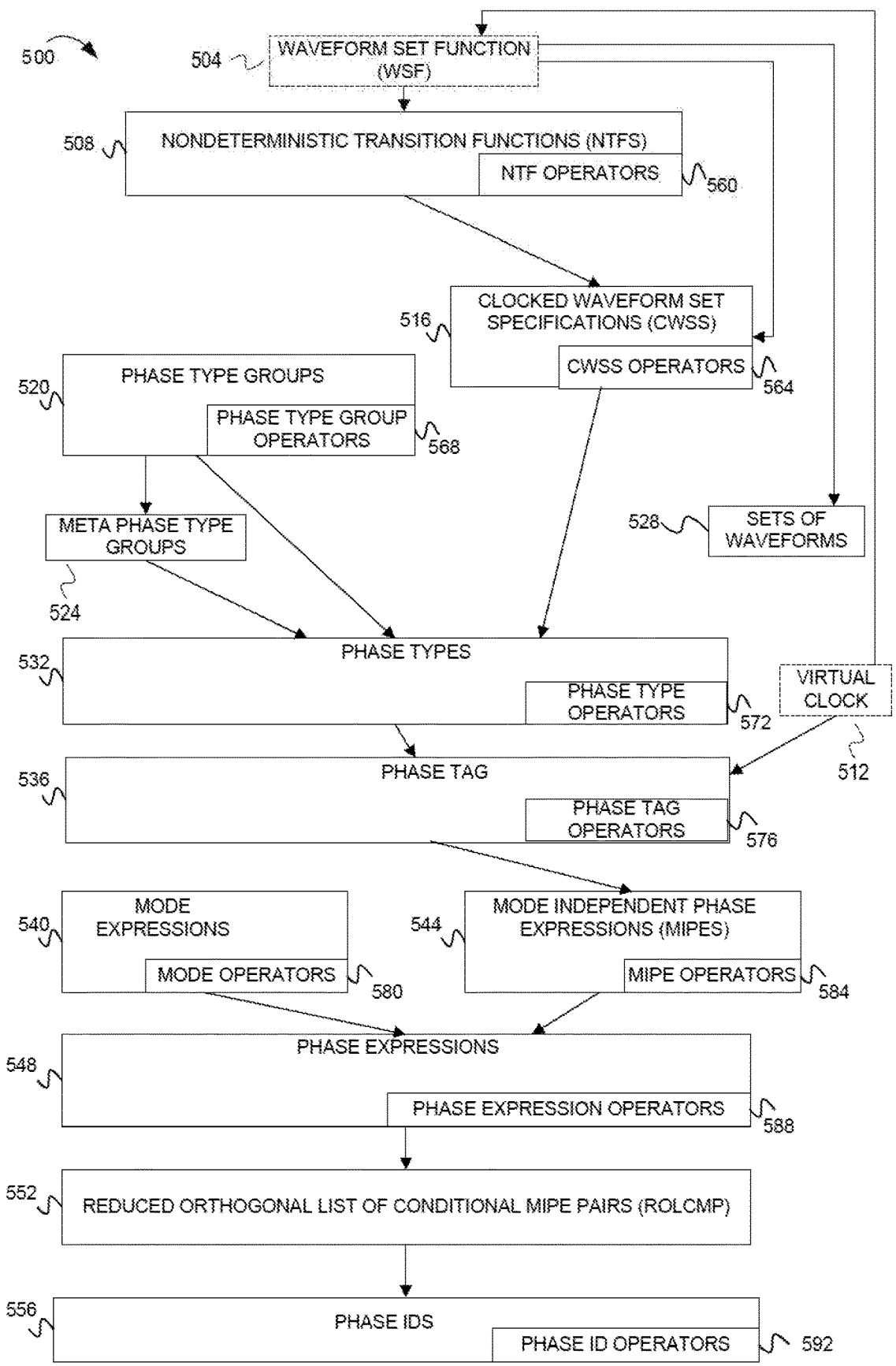
FIG. 5 is a conceptual diagram that depicts an example hierarchy of relationships among data constructs.

The NTFs, which can be considered the building blocks, will be first described. Constructs that build upon these NTFs will then be described. FIG. 5 depicts an example hierarchy of data constructs/objects built upon NTFs revealing relationships between the previously mentioned phase tags and NTFs. FIG. 5 will be explored in more detail after describing the data constructs individually. It is noted that the FG NTF is used by the glitch-aware algebra to indicate glitch-free time ranges, i.e., where only a single transition can occur within a subsequence of FG NTFs. As defined by the glitch-aware algebra, non-FG NTFs can be glitch-prone. The glitch-prone NTFs (non-FG NTFs) indicate that multiple transitions can occur within a range of non-FG NTFs.

The FG NTF is typically used in a subsequence of FG NTFs of a sequence of NTFs. For example, in a sequence of NTFs of {FS, FG, FG, FG, FS}, there can only be one transition in the subsequence of {FG, FG, FG}. In another sequence of NTFs of {FS, FX, FX, FX, FS}, there can be up to three transitions in the subsequence of {FX, FX, FX}. Table 2 identifies NTFs employed for phase algebra based RTL design evaluation. As shown in the Function Table, the input (mp, wp) includes a don't care term ("x") for the "mp" element for all non-FG NTFs, meaning that the calculation of the output of non-FG NTFs is not concerned with whether a transition occurred in a range of previous NTFs. The FG NTF defines its output as a function of both "wp" (waveform) and "mp" (indication of whether a transition occurred in the current subsequence of FG NTFs). If the "mp" element indicates that a transition has occurred in one of the previous FG NTFs in the subsequence, then another transition is not permitted by the current FG NTF. The first column of Table 2 is a label given to each NTF. The label in the first column of Table 2 is arbitrary. The second column of Table 2 specifies the relationship between inputs to the NTF and outputs that the NTF generates based on the inputs provided to the NTF. The inputs to each NTF include a previous waveform state denoted wp and a previous M-function state, denoted mp. The output of each NTF is a set of possible next waveform states, denoted WN. Each NTF specifies one value of a G-function that equals 0 or 1, as noted in the third column of Table 2. A G-value of 1 specifies that the NTF is "glitch-aware." Columns four through eight of Table 2 include one or more adjacency restrictions. The adjacency restrictions specify that if an NTF appears at time t−1, then certain NTFs are prohibited at time t, based on the NTF that appeared at time t1. For example, NTF FF is prohibited at time t if the NTF at time t−1 had been either F0 or FL.

Additionally, each NTF is associated with a waveform set diagram symbol, shown in columns four through eight of Table 2, that can appear at time t given an NTF at time t−1. For example, the NTF F0, shown in row 1 of Table 2, exhibits the waveform set diagram symbol depicted in column 6 at time t if the NTF preceding F0 at time t−1 was FG. However, if the NTF preceding F0 at time t−1 was FF, FR, FS, or FX, then the waveform set diagram symbol of F0 is as depicted in column 8 of Table 2. A waveform set diagram symbol illustrates the set of possible waveform states at time t, including whether such states can differ from the states at time t−1, indicated by a vertical line, which represents a transition or possible transition at time t. These NTFs are combined in sequences to form compact multi-waveform representations that comply with the above defined adjacency restrictions. When propagating compact multi-waveform representations throughout a design, the compact multi-waveform representations are decomposed into the NTFs in order to apply the appropriate NTF operators upon the constituent NTFs. It is noted that the FG NTF is used by the glitch-aware algebra to indicate glitch-free time ranges. It is also noted that the FF and FR NTFs are used by the clock-gating algebra to indicate a double-gated clock type.

Table 3 (shown in FIGS. 18A and 18B) identifies the NTF operators. The NTF operators correspond to operations of circuit components (e.g., ntf_and) and some operations employed for coherency (e.g., ntf_fix_adjacent and ntf_is_subset). The operations can be implemented with look ups because the look up tables are constructed based on the signal behavior represented by the NTFs and the foundational functions that capture transitional behavior. Table 3 identifies eight NTF operators. The ntf_not operator determines the NTF produced at the output of an inverter based on the NTF provided to the input of an inverter. The ntf_and operation determines the NTF produced at the output of an AND gate, given NTFs provided at the inputs of an AND gate. The ntf_xor operator determines the NTF produced at the output of a XOR gate given NTFs provided at the inputs of a XOR gate.

The ntf_trans_latch operator determines the NTF at the output of a zero-delay transparent latch based on the NTFs provided at the inputs of a zero-delay transparent latch. The ntf_trans_latch_const operator determines the NTF at the output of a zero delay transparent latch given a first NTF that corresponds to a constant data input to the zero-delay transparent latch and a second NTF input that corresponds to the clock input to the zero-delay transparent latch. The ntf_unit_delay_range operator determines the NTF output of a unit delay component based on NTF inputs to the unit delay component. The ntf_is_subset operator determines whether a first NTF is a subset of a second NTF, returning a value of true if a first NTF is a subset of a second NTF. The ntf_fix_adjacent operator returns an equivalent but valid value for a second NTF when the second NTF follows a first NTF in time. Thus, the ntf_fix_adjacent operator ensures that the adjacency restrictions associated with NTFs are observed.

Column four of Table 3 includes descriptions similar to the foregoing. Column two of Table 3 indicates example syntax that can be employed to call the corresponding operator named in column one of Table 3. Table 3 employs the syntax ntf_output=ntf_operator (ntf_input1, ntf_input2) for a dual input operator and ntf_output=ntf_operator (ntf_input) for a single input. Column three of Table 3 indicates the look up tables associated with each of the NTF operators of column one of Table 3. The look up tables of column three of Table 3 indicate the NTF output generated based on the NTF input provided to each NTF operator listed in column one of Table 3. It is noted that Table 3 includes entries for the FG NTF, as used by the glitch-aware algebra. It is noted that Table 3 includes entries for the FF and FR NTFs, which are used by the clock-gating algebra.

FIGS. 4A-4B depict example NTF sequences and the information encoded in the sequences. In this description, a sequence of NTFs is referred to as a clocked waveform set specification (CWSS). FIG. 4A depicts a sequence of NTFs relative to a virtual clock 404A. A virtual clock is a clock waveform generated by a source that might be external to the circuit design being evaluated. Three timing parameters define any virtual clock: tP, denoting the period of a clock, which is the time interval from any rising edge to the next; tD, denoting the duty cycle of the clock, which is the time interval from any rising edge to the next falling edge; and tO, denoting the offset of the clock, which is the earliest non-negative time at which the clock rises. Each CWSS consists of eight NTFs. Each NTF is associated with a numerical value, ranging from 0 to 7, referred to as a CWSS slot. The CWSS slot identifies one NTF within a CWSS. Each slot is associated with certain times within a WSF. Table 4 indicates how the timing parameters of a virtual clock correlate to the constituent NTFs of a CWSS.

TABLE 4

Virtual Clock Information

| Slot | Relation to corresponding virtual clock | Times (in terms of virtual clock parameters tP, tD, tO) | value of wsf(t) |
|---|---|---|---|
| 0 | just before rising edge | All times t such that ((t − tO) modulo tP) = tP − 1 | wsf(t) = ntf0 |
| 1 | at time of rising edge | All times t such that ((t − tO) modulo tP) = 0 | wsf(t) = ntf1 |
| 2 | just after rising edge | All times t such that ((t − tO) modulo tP) = 1 | wsf(t) = ntf2 |
| 3 | between rising and falling edges | All times t such that 1 < ((t − tO) modulo tP) < tD − 1 | wsf(t) = ntf3 |
| 4 | just before falling edge | All times t such that ((t − tO) modulo tP) = tD − 1 | wsf(t) = ntf4 |
| 5 | at time of falling edge | All times t such that ((t − tO) modulo tP) = tD | wsf(t) = ntf5 |
| 6 | just after falling edge | All times t such that ((t − tO) modulo tP) = tD + 1 | wsf(t) = ntf6 |
| 7 | between falling and rising edges | All times t such that tD + 1 < ((t − tO) modulo tP) < tP − 1 | wsf(t) = ntf7 |

In particular, Table 4 relates each CWSS slot, shown in the first column, to a set of times related to virtual clock timing parameters indicated in the third column, which, in turn, relate to NTFs and WSFs indicated in the fourth column. FIG. 4B depicts a diagram of a set of waveforms 416C, which can be expressed as a CWSS 404C, consisting of CWSS slots 408C, each CWSS slot 408C corresponding to an NTF 412C. In FIG. 4B, the notation tR refers to the time of a rising edge of a virtual clock associated with a CWSS, which also corresponds to slot I of the CWSS in this depiction. The notation tF refers to the time of a falling edge of the same virtual clock, which also corresponds to slot five of this CWSS.

The CWSS construct has operators that are abstractions of the NTF operators. Table 5 identifies the CWSS operators.

TABLE 5

CWSS Operators

| Function Name | Prototype (Call Syntax) | Definition (Implementation) | Description |
|---|---|---|---|
| cwss_not | cwss_y = cwss_not (cwss_a) | for each slot i, cwss_y[i] = ntf_not(cwss_a[i]) | Calculates the CWSS produced by an inverter. |
| cwss_and | cwss_y = cwss_and (cwss_a, cwss_b) | See generic algorithm. | Calculates the CWSS produced by an AND gate. |
| cwss_xor | cwss_y = cwss_xor (cwss_a, cwss_b) | See generic algorithm. | Calculates the CWSS produced by an XOR (exclusive-OR) gate. |
| cwss_trans_latch | cwss_q = cwss_trans_latch (cwss_c, cwss_d) | See generic algorithm. | Calculates the CWSS produced by a zero-delay transparent latch. |

TABLE 5-continued

CWSS Operators

| Function Name | Prototype (Call Syntax) | Definition (Implementation) | Description |
| --- | --- | --- | --- |
| cwss_trans_latch_const | cwss_q = cwss_trans_latch_const (cwss_c, cwss_d) | See generic algorithm. | Calculates the CWSS produced by a zero-delay transparent latch, assuming the data input is constant |
| cwss_fix_latch | cwss_y = cwss_fix_latch (cwss_a) | See separate algorithm. | Replaces any occurrence of FX in slots 0-2 and 4-6 with FG if followed by FS and NOT preceded by FG. This has no sementic effect, but allows the CWSS to subset-match CWSS's containing FG's. (Can't replace in slots 3 and 7 since those represent time ranges.) |
| cwss_unit_delay | cwss_y = cwss_unit_delay (cwss_a) | cwss_y = { cwss_a[0], cwss_a[0], cwss_a[1], ntf_unit_delay_range(cwss_a[2], cwss_a[3]), cwss_a[4], cwss_a[4], cwss_a[5], ntf_unit_delay_range(cwss_a[6], cwss_a[7]) } | Calculates the CWSS produced by a unit delay block (UDB), assuming a "timed path". i.e., we assume the stability windows around the rising or falling edge, if any, are preserved. Notice that slots 0 and 4 retain their pre-delayed values. We assume that neither slots 0 nor 4 contain F0 or F1; otherwise we would need to fix possible adjacency violations. |
| cwss_path_delay | cwss_y = cwss_path_delay (type,cwss_a) | See separate algorithm. | Calculates the CWSS produced by a path delay block (PDB), assuming a path which is timed to the leading or trailing edge of the virtual clock, as indicated by the type argument. |
| cwss_is_subset | bool_b = cwss_is_subset (cwss_a, cwss_b) | See separate algorithm. | Determines if the set of waveforms specified by one CWSS is a subset of the set specified by another. |

The CWSS operators correspond to operations of circuit components (e.g., cwss_and) and some operations employed for coherency (e.g., cwss_is_subset). As can be seen by the implementation definition column, these operators rely on algorithms (referred to as "separate algorithm" and "generic algorithm"). These algorithms invoke the NTF operators for each NTF that constitutes a CWSS. These algorithms are discussed later. There are nine CWSS operators. These include cwss_not, cwss_and, cwss_xor, cwss_trans_latch, cwss_trans_latch_const, cwss_is_subset, and cwss_unit_delay, which correspond to the counterpart NTF operators but perform operations on CWSSs. The CWSS operator cwss_fix_latch corresponds to the NTF operator ntf_fix_adjacent, but for a particular use related to a transparent latch. The CWSS operator cwss_path_delay determines the CWSS generated by a path delay block.

Column one of Table 5 lists the CWSS operators. Column two of Table 5 indicates example CWSS operator syntax. Column four of Table 5 describes the function of each CWSS operator. Column three of Table 5 refers to the algorithms that implement seven of the nine CWSS operators. In one embodiment, the cwss_not operator can be implemented in a for loop that iterates through each slot of the CWSS, invoking the ntf_not operator for each CWSS slot. Since the slots of a CWSS correspond to NTFs, the CWSS operators generally are implemented by calling NTF operators, manipulating each of the eight NTFs that comprise the CWSS. The cwss_unit_delay operator is implemented through the equation listed in row seven, column three of Table 5. It is noted that the cwss_fix_latch, the cwss_path_delay, and cwss_is_subset CWSS operations are used by both the glitch-aware algebra and by the clock-gating algebra.

Table 6 (shown in FIGS. 19A-19D) identifies 55 phase types and relationships with CWSSs and phase type groups. Each phase type can be considered a construct (e.g., variable or notation) that represents a set of waveforms as a function of a non-specific virtual clock, as mentioned above. Column one of Table 6 is a number assigned to each phase type. The assigned numbers can be referred to as phase type order numbers. Selection of a phase type as a result of an operation that models a circuit component (e.g., an AND gate or inverter) conforms to this defined order of phase types. Algorithms discussed later will refer back to this ordering. Column two of Table 6 includes example symbols assigned to each phase type. Column three of Table 6 indicates names assigned to each phase type for ease of reference. Column four of Table 6 includes a waveform set diagram illustrating the set of waveforms designated by the phase type. It is noted that phase tags 45-47 and 49-51 are used by the glitch aware algebra. It is also noted that phase tags 15-44 are used by the clock-gating algebra.

The waveform set diagram is a function of a virtual clock, as indicated by the markers tR and tF in column four of Table 6, which designate the rising and falling times, respectively, of a virtual clock, and which may thus vary from one virtual clock to another. Accordingly, each phase type symbol corresponds to a waveform set diagram. Thus, operations performed on a phase type are operations performed on a set of waveforms, each depicted in column four of Table 6. Column five of Table 6 indicates a CWSS associated with each phase type. Each CWSS is comprised of eight NTFs, which collectively represent the waveform set diagram of column four of Table 6. Column six is a group name assigned to each phase type, referred to herein as phase type groups.

Table 7 identifies phase type groups (PTGS).

TABLE 7

| Phase Type Group (PTG) | Member Phase Type(s) | Description |
|---|---|---|
| G0 | 0 | Constant zero. |
| G1 | 1 | Constant one. |
| GA | * | The set of all possible waveforms. Used whenever no other phase type can adequately and completely express the actual set produced by an operator. Could be used by a designer to specify that an input is completely nondeterministic. |
| GCE | C!E, C!E%^ | Edge-pulsed ungated or high-gated clock. (Pulses on every edge--falling and rising--of the virtual clock.) The clock is guaranteed to be active (high) during both phases of every cycle. A latch clocked by such a clock and having a constant data input will have a constant output. |
| GCI | ~C!1, ~(~C)!1, ~C!E, (~C!1)%^, (~(~C)!1)%^, (~C!E)%^ | Inverted pulsed ungated or high-gated clock. Can also be thought of as "invalid clock" because such a clock should not be directly attached to the clock input of a latch. |
| GCL | C, C#1, C!1, C%^, C#1%^, C!1%^ | Leading-phase ungated or high-gated clock. The clock is guaranteed to be active (high) during the first (leading) half of the virtual clock's cycle. A latch clocked by such a clock and having a constant data input will have a constant output. |
| GCT | ~C, ~C#1, (~C)!1, (~C)%^, (~C)#1%^, (~C)!1%^ | Trailing-phase ungated or high-gated clock. The clock is guaranteed to be active (high) during the second (trailing) half of the virtual clock's cycle. A latch clocked by such a clock and having a constant data input will have a constant output. |
| GGE | C!E%*, C!E%? | Edge-pulsed low- or double-gated clock. (Pulses on every edge--falling and rising--of the virtual clock.) Clock may be low throughout any given phase of any given cycle. A latch clocked by such a clock and having a constant data input will not have a constant output (since it is unpredictable when the latch will sample the input). |
| GGI | (~C!1)%*, (~(~C)!1)%*, (~C!E)%*, (~C!1)%?, (~(~C)!1)%?, (~C!E)%? | Inverted pulsed low- or double-gated clock. Can also be thought of as "invalid clock" because such a clock should not be directly attached to the clock input of a latch. |
| GGL | C%*, C#1%*, C!1%*, C%?, C#1%?, C!1%? | Leading-phase low- or double-gated clock. The clock may be active (high) during the first (leading) half of the virtual clock's cycle; or it may be low or high throughout the cycle. A latch clocked by such a clock and having a constant data input will not have a constant output (since it is unpredictable when the latch will sample the input). |
| GGT | (~C)%*, (~C)#1%*, (~C)!1%*, (~C)%?, (~C)#1%?, (~C)!1%? | Trailing-phase low- or double-gated clock. The clock may be active (high) during the second (trailing) half of the virtual clock's cycle; or it may be low or high throughout the cycle. A latch clocked by such a clock and having a constant data input will not have a constant output (since it is unpredictable when the latch will sample the input). |
| GLE | C@E | Driven by latch(es) clocked by edge-pulsed or both leading- and trailing-phase clocks. |
| GLL | C@LPGF, C@LGF, C@LP, C@L | Driven by latch(es) clocked by leading-phase clocks. |
| GLT | C@TPGF, C@TGF, C@TP, C@T | Driven by latch(es) clocked by trailing-phase clocks. |
| GN | <> | Null phase type, representing an empty set of waveforms. Used to mean that a given signal should be ignored for the purposes of classifying downstream signals. This could be used as the default phase type for any circuit input which is not assigned a phase type by the designer. |
| GS | ? | Stable (constant) signal: either constant zero or constant one (we don't know which). |
| GU | — | Unknown phase type. This is the default phase type assigned to all internal nets. It indicates those nets for which the propagation algorithm has not yet calculated a phase type. In general, this will not appear on any net after phase propagation has completed. |

A phase type group represents one or more phase types. For example, the phase type group GCE represents a grouping of two phase types. Phase type groups can be used to differentiate among phase types that have the same CWSS. Phase types are assigned to a phase type group based on the intended use of the phase type. For instance, certain phase types are implemented to designate clock signals, while other phase types are implemented to designate data signals or constant value signals. Column one of Table 7 indicates example identifiers to designate each phase type group. Column two of Table 7 indicates the phase types that are members of each phase type group. Column three of Table 7 provides a description of each phase type group.

The combination of a phase type and a phase type group allows compact representation of multiple waveforms based on NTFs and the adjacency restrictions placed on the NTFs. In other words, phase types are representations of CWSSs, and phase type groups allow for CWSSs to be overloaded. Tables 8 and 9 identify operators for phase types and phase type groups. These operators invoke the previously defined CWSS and NTF operators.

of waveforms. In Table 8, seven example phase type operators are listed in column one: pt_not, pt_and, pt_xor, pt_latch, pt_flipflop, pt_unit_delay, and pt_path_delay.

The pt_not operator determines the phase type output of an inverter given a phase type input. The pt_and operator determines the phase type output of an AND gate given at least two phase type inputs. The pt_xor operator determines the phase type output of an XOR gate given at least two phase type inputs. The pt_latch operator determines the phase type output of a transparent latch given a clock signal phase type input and a data signal phase type input. The pt_flipflop operator determines the phase type output of a flip-flop given a clock signal phase type input and a data signal phase type input. The pt_unit_delay operator determines the phase type output of a unit delay given a phase type input. The pt_path_delay determines the phase type output of a path delay block given a phase type input. It is noted that the The pt_latch operator and the pt_path_delay operator are used by the glitch-aware and the clock-gating algebra.

The foregoing description is included in column four of Table 8, which also describes the purpose of each phase type

TABLE 8

Phase Type Operators

| Function Name | Prototype (Call Syntax) | Definition (Implementation) | Description |
|---|---|---|---|
| pt_not | pt_y = pt_not (pt_a) | pt_y = first_matching_pt ( cwss_not (pt_to_cwss(pt_a)), ptg_not (pt_to_ptg(pt_a)) ) | Calculates the phase type produced by an inverter. |
| pt_and | pt_y = pt_and (pt_a, pt_b) | pt_y = first_matching_pt ( cwss_and (pt_to_cwss(pt_a), pt_to_cwss(pt_b)), ptg_and (pt_to_ptg(pt_a), pt_to_ptg(pt_b)) ) | Calculates the phase type produced by an AND gate. |
| pt_xor | pt_y = pt_xor (pt_a, pt_b) | pt_y = first_matching_pt ( cwss_xor (pt_to_cwss(pt_a), pt_to_cwss(pt_b)), ptg_xor (pt_to_ptg(pt_a), pt_to_ptg(pt_b)) ) | Calculates the phase type produced by an XOR (exclusive-OR) gate. This algorithm produces a more specific result than decomposing XOR into ANDs and inverters. |
| pt_latch | pt_y = pt_latch (pt_c, pt_d) | if ( pt_to_ptg(pt_d) is G0, G1, or GS ) { // data is constant<br>    Let cwss_predelay = cwss_trans_latch_const ( pt_to_cwss(pt_c), pt_to_cwss(pt_d) )<br>}<br>else {<br>    Let cwss_predelay = cwss_trans_latch ( pt_to_cwss(pt_c), pt_to_cwss(pt_d) )<br>}<br>pt_y = first_matching_pt ( cwss_unit_delay (cwss_fix_latch (cwss_predelay)),<br>    ptg_latch( pt_to_ptg(pt_c), pt_to_ptg(pt_d) ) ) | Calculates the phase type produced by a latch. Note that the latch circuit primitive has a delay of one time unit. We could optionally model a zero-delay latch by omitting the call to cwss_unit_delay. |
| pt_flipflop | pt_y = pt_flipflop (pt_c, pt_d) | pt_y = pt_latch (pt_c, pt_latch (pt_not (pt_c), pt_d) ) | Calculates the phase type produced by a flip-flop. Leverages the fact that a flip-flop can be implemented by two transparent latches with opposite-phase clocks. |
| pt_unit_delay | pt_y = pt_unit_delay (pt_a) | pt_y = first_matching_pt ( cwss_unit_delay (pt_to_cwss(pt_a)), ptg_unit_delay (pt_to_ptg(pt_a)) ) | Calculates te phase type produced by a unit delay block (UDB). |
| pt_path_delay | pt_y = pt_path_delay (pt_a) | if ( pt_to_ptg(pt_a) is GLL ) {<br>    pt_y = first_matching_pt ( cwss_path_delay (leading, pt_to_cwss(pt_a)), GLL );<br>}<br>else if ( pt_to_ptg(pt_a) is GLT ) {<br>    pt_y = first_matching_pt ( cwss_path_delay (trailing, pt_to_cwss(pt_a)), GLT );<br>}<br>else {<br>    pt_y = pt_a;<br>} | Calculates the phase type produced by a path delay block (PDB). |

The phase type operators included in Table 8 correspond to circuit components and to NTF and CWSS operators. The phase type operators operate upon the higher level construct of phase types by invoking the operators of lower level constructs. Since phase types correspond to sets of waveforms, the phase type operators represent operations on sets operator. Column two of table 8 provides example syntax for the phase type operators. The example phase type operator syntax is as follows: pt_y=pt_operator (pt_input) for a single input phase type operator and pt_y=pt_operator (pt_input1, pt_input2) for a dual input phase type operator. Column three of Table 8 includes example pseudocode for implementing the phase type operators. Each of the phase type operators calls a function identified as first_matching_pt function, which relies upon the ordering of phase types in Table 6.

The phase type operators listed in Table 8 each are comprised of a call to a corresponding CWSS operator and a phase type group operator. For instance, the pt_xor operator calls the first_matching_pt function. The arguments to the first_matching_pt function include the CWSS operator cwss_xor and the phase type group operator ptg_xor. The arguments to the cwss_xor operator include the pt_to_cwss function, called for each phase type input. The pt_to_cwss function converts a phase type to a CWSS. The arguments to the ptg_xor operator include the pt_to_ptg function, called for each phase type input. The pt_to_ptg function converts a phase type to a phase type group. These conversions are based on the relationships identified in Table 6, which can be encoded in accordance with various data structures. Each phase type is associated with a CWSS and a phase type group. Each CWSS is comprised of NTFs. Each NTF is based upon a WSF, which, in turn, represents a multiple waveforms.

In some embodiments, the operation of the phase type operators may be modified for clock-gating algebra. Below are four modifications to the operation of the phase-type operators of Table 8.

If the clock-gating algebra is implemented, a latch phase of a phase type input can be ignored. Specifically, if the AND or the XOR phase type operator is selected (e.g., the 2-input pt_and or the pt_xor phase type operator of Table 8), the following can be performed. If this phase type operator has one phase type input that is a clock type phase type, and also has a second phase type input that is a latch type phase type, then the latch type phase type can be replaced with an unknown constant phase type (i.e., with the phase type designated by the "?" symbol). As described above with reference to Table 7, a latch type phase type can include a phase type belonging to the GLE, GLL, or the GLT phase type group. Based on Table 7, a clock type phase type can include a phase type belonging to the GCE, GCI, GCL, GCT, GGE, GGI, GGL, or the GGT phase type group. The appropriate (i.e., the AND or the XOR) phase operator is then computed. As a result, an AND phase operator of pt_and as applied to phase-type inputs of ("C","C@L") would produce the result of "C %*" instead of "*".

If the clock-gating algebra is implemented, a clock type input can be speculatively propagated. Specifically, if the AND or XOR phase operator is selected (e.g., the 2-input pt_and or the pt_xor phase type operator of Table 8), the following can be performed. If this phase operator has one phase type input that is a clock type phase type, and also has a second phase type input of an unknown phase type (e.g., "-"), then the unknown phase type can be replaced with an unknown constant phase type (i.e., with the phase type designated by the "?" symbol). As described above, a clock type phase type can include a phase type belonging to the GCE, GCI, GCL. GCT, GGE, GGI, GGL, or the GGT phase type group. The appropriate (i.e., the AND or the XOR) phase operator is then computed. This embodiment can be used in circuit designs that include an output of a latch that feeds back to that latch's enable or clock input. This phase operator can generate a gated clock type result, thus allowing the gated clock type of a compact multi-waveform representation to propagate through the gate, instead of using an unknown result.

If the clock-gating algebra is implemented, a common gating condition can be assumed. Specifically, if a binary phase type operator with two phase type inputs is used, and both of the phase type inputs are a gated clock type phase type, then the following can be performed. The variable pt_op can represent the binary phase type operator. The variables pt_a and pt_b can represent the two phase type inputs. The variable pt_y can represent the result of the phase type operator, according to the following. Based on Table 6, a gated clock type phase type can include a phase type having an order number from 15 to 44, as shown in column one of Table 6. First, each of the gated clock type phase types can be converted to a corresponding ungated clock type phase type, such as to ungated clock variables pt_a_ug and pt_b_ug. An ungated clock type phase type can include a phase type having an order number from 5 to 14, as shown in column one of Table 6. An ungated clock type phase type can be obtained from a gated clock type phase type by subtracting 10, 20, or 30 from the order number of the gated clock type phase type. For example, a phase-type input of a gated clock type phase type of "C!1%*", which has order number 19 as shown in column one of Table 6, can be converted to a phase type input of an ungated clock type phase type of "C!1", which has order number 9 as shown in column one of Table 6. Next, a temporary phase type variable (e.g., pt_y_temp) is determined to be equal to the result of the binary phase type operator (e.g., pt_op) being applied to the ungated clock type variables. For example, the temporary phase type variable pt_y_temp is set to the result of the binary phase type operator pt_op being applied to pt_a_ug and pt_b_ug. If the temporary phase type variable is of a clock type phase type, then the following can be performed.

If pt_a is a double-gated type phase type, indicated by an order number in the range 35 to 44, then the variable pt_a_const can be set to "?". Else if pt_a is a high-gated type phase type, indicated by an order number in the range 25 to 34, then the variable pt_a_const can be set to "1". Else, pt_a is a low-gated type phase type, indicated by an order number in the range 15 to 24, and pt_a_const can be set to "0". Similarly, if pt_b is a double-gated type phase type, then pt_b_const can be set to "?". Else if pt_b is a high-gated type phase type, then the pt_b_const can be set to "1". Else, pt_b is a low-gated type phase type, and pt_b_const can be set to "0".

A result of (pt_y_const=pt_op(pt_a_const, pt_b_const)) can be determined to yield "?", "1", or "0". This result can represent a gated state of the phase type output (assuming, as noted above, that both of the phase type inputs are of the gated clock phase type).

If pt_y_const is equal to "?" or "0", then the variable pt_y_temp can be reassigned to the result of the AND phase type operator, such as pt_and, of (pt_y_temp, "T"). The foregoing result can be a low-gated clock type. If a result of pt_y_const is equal to "?" or "1", then the variable pt_y_temp can be reassigned to the result of the OR phase operator, such as pt_or of (pt_y_temp, "?"). In one implementation, the pt_or (a,b) is the result of pt_not(pt_and (pt_not(a), pt_not(b))). In other words, using De Morgan's law, an OR operator can be expressed in terms of using AND and NOT (inverter) operations. It is noted that if pt_b_const is equal to "?", both this step and the previous step (of reassigning the variable pt_y_temp) are both performed. In any of the steps above, the result of the phase type operator (e.g., pt_y) can then be set to the result (e.g., pt_y_temp).

If the clock-gating algebra is implemented, one of the phase type inputs to a binary phase type operator can be ungated. If some binary phase type operator with two inputs is used, and one phase type input is a gated clock type phase type, and the result of an initial operation of the binary phase operator using both inputs is a "*", then the gated clock type phase type can be replaced with a corresponding ungated clock type phase type, which can be obtained by subtracting 10, 20, or 30 from the order number of the gated clock type phase type, as shown in column one of Table 6. The result of the binary phase type operator is then generated using the corresponding ungated clock type phase type. For example, if the foregoing condition is met, then a gated clock type phase type input of "C!1%*" is converted to "C!1".

Figure 20:
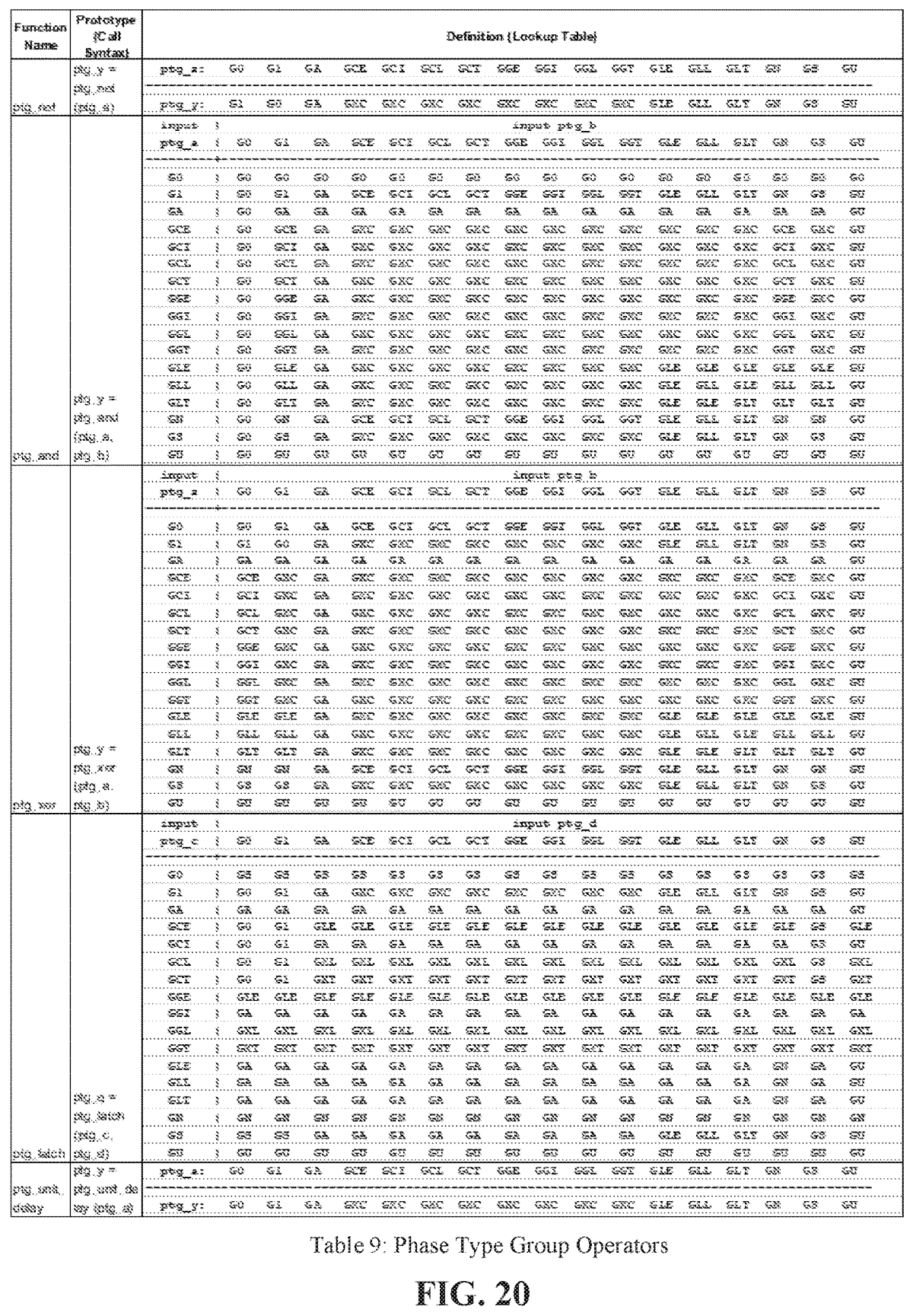

Table 9 (shown in FIG. 20) identifies five phase type group operators by example function names in column one: ptg_not, ptg_and, ptg_xor, ptg_latch, and ptg_unit_delay. These phase type group operators correspond to the inverter, AND gate, XOR gate, transparent latch, and unit delay circuit components. Column two of Table 9 indicates an example syntax that may be used for the phase type group operators. The phase type group operator syntax depicted in column two of Table 9 generally follows the other syntaxes described herein. For a single input phase type group operator, the syntax is ptg_y=ptg_operator (ptg_input). For a dual input phase type group operator, the syntax is ptg_y=ptg_operator (ptg_input1, ptg_input2). Column three of Table 9 is a table that specifies the resulting phase type group output given a set of phase type group inputs. These tables are similar to those specified in Table 3 for the NTF operators.

The phase type group operators identified in Table 9 indicate possible output referred to herein as meta-phase type groups (meta-PTGs). A meta-phase type group is a grouping of phase type groups. The phase type group operators in Table 9 provide for the possibility of three (3) meta-PTGs. These are denoted herein as GXC, GXL, and GXT. Table 10 identifies the phase type group members of each meta-PTG. Meta phase type groups are implemented to specify results of phase type group operations that conform to the rules specified herein. Phase type groups allow for the compact representations of multiple waveforms because the group identifiers can be used to disambiguate a sequence of nondeterministic signal transition representations that map to different phase types.

TABLE 10

| Meta-Phase Type Groups | |
| --- | --- |
| META PHASE TYPE GROUPS | PHASE TYPE GROUPS |
| GXC | G0, G1, GA, GCE, GCI, GCL, GCT, GGE, GGI, GGL, GGT |
| GXL | GA, GLL |
| GXT | GA, GLT |

FIG. 5 is a conceptual diagram that depicts an example hierarchy of relationships among data constructs. Depending on the programming language and particular literature, a data construct can be referred to as a class, an object, a structure, etc. This example data construct 500 includes several elements or members that define the structure of the class and behavior of the class. The structure of this data construct 500 is defined by the following members: NTFs 508, CWSSs 516, phase type groups 520, meta phase type groups 524, phase types 532, phase tags 536, mode expressions 540, mode independent phase expressions (MIPEs) 544, phase expressions 548, reduced orthogonal list of conditional MIPE pairs (ROLCMPs) 552, and phase ids 556. The behavior of the data construct 500 is defined by functions or operators that operate on the depicted members: NTF operators 560, CWSS operators 564, phase type group operators 568, phase type operators 572, phase tag operators 576, mode operators 580, MIPE operators 584, phase expression operators 588, and phase id operators 592. Subsequent figures provide additional detail regarding each illustrated member and operator.

FIG. 5 depicts a waveform set function (WSF) 504 as supporting the NTF data construct 508. The WSF 504 is depicted with a dashed line because the WSF 504 may not be explicitly defined in a data construct. An NTF data construct can be defined in a class, for example, based on assumptions that rely upon a WSF without explicitly indicating the mappings from each unit of time to an NTF. But the NTF data construct 508 would express the definitions indicated in Table 2.

A CWSS 516 is a sequence of NTFs 508. Together with a virtual clock 512, a CWSS 516 defines sets of waveforms 528. The virtual clock 512 is also depicted with a dashed line because this may not be explicitly defined in a data construct. The information for a virtual clock (e.g., timing parameters) can be assumed or implied by the CWSS data construct 516. The NTF operators 560 manipulate each NTF 508 that comprises an instance of a CWSS 516, thereby manipulating the CWSS 516 instance.

A user applies phase tags 536 or phase expressions 548 to the primary inputs and the outputs of clock generators in a circuit design. Operations are performed on these phase tags 536 or phase expressions 548. When the operations are performed, the phase tags 536 or phase expressions 548 are propagated throughout a design, and the resulting phase tags 536 or phase expressions 548 can be analyzed to identify possible design defects or particular design characteristics. A phase tag 536 or phase expression 548 is propagated throughout the circuit design by transforming input phase tags or input phase expressions received at primary inputs and outputs of clock generators in a circuit design through the previously discussed look up tables so that each output net of the circuit design includes a phase tag 536 or phase expression 548.

A phase type 532 is a generalized version of a phase tag 536. While a phase tag 536 can be associated with a particular virtual clock 512, a phase type 532 is a generalized expression representing a set of waveforms 528. As with the other variable types, a phase type 532 can be manipulated through phase type operators 572. A phase type 532 is associated with a clocked waveform set specification (CWSS) 516 and a phase type group 520.

As previously mentioned, multiple phase types 532 can be associated with the same CWSS 516. A phase type group 520 distinguishes such phase types 532, and can distinguish characteristics of signals represented by phase types 532, such as clock signals as compared to data signals. Certain phase type groups 520 can be constituent elements of a meta phase type group 524. Phase type groups 520 and meta phase type groups 524 can be manipulated through phase type group operators 568.

Phase tags 536 and phase expressions 548 themselves are comprised of lower level data constructs (e.g., CWSSs) and also can be converted into different data constructs on which operations are executed. A phase expression 548 is comprised of zero or more mode expressions 540 and one or more MIPEs 544.

A mode expression 540 represents a condition in which a design can operate among multiple modes. A mode is a Boolean function of the value of a signal in a circuit, referred to as a mode signal. A mode signal can be used to select between a first signal and a second signal that is different from the first signal. For example, a design might include a dual input multiplexer. A first input to the multiplexer might be a first clock signal and a second input to the multiplexer might be a second clock signal that is asynchronous to the first clock signal. The multiplexer can receive a selector signal that causes it to select between the first signal and the second signal. In this example, the design includes more than one mode, which can be represented via a mode expression 540. Operations can be performed on the mode expressions 540 through the mode operators 580.

A MIPE 544 is comprised of one or more phase tags 536. A MIPE 544 represents a set of waveforms 528 that is a function of the sets of waveforms 528 represented by the constituent phase tags 536 of the MIPE 544. Operations can be performed on a MIPE 544 through the MIPE operators 584.

A phase expression 548 can be converted into a reduced orthogonal list of conditional MIPE pairs 552, designated as a ROLCMP 552. A ROLCMP 552 is a data construct that enables phase expressions 556 to be converted into phase ids 556. A phase id 556 is a numerical handle associated with phase expressions 548, enabling phase expressions 548 to be more easily manipulated, such as described in the U.S. Provisional Patent Application, Ser. No. 61/912,345.

A phase tag 536 represents a set of waveforms 528 via CWSSs. In some cases, a phase tag 536 can be associated with a virtual clock 512. Syntactically, if a phase tag 536 is associated with a virtual clock 512, the phase tag 536 will follow a syntax which includes the name of the virtual clock 512. One such syntax can be represented as "Clock Name@Type of Clock Signal." For example, the phase tag 536 "A@L" designates the waveform set 528 associated with a latch clocked by the leading phase of virtual clock "A." However, in other cases, a phase tag 536 may not be associated with a virtual clock 512. For instance, the phase tag "*" designates the set of all possible waveforms 528. Phase tags 536 can be manipulated via phase tag operators 576. Phase tag operators 576 implement operations on phase tags 536. A phase tag 536 can be employed to distinguish among a type of signal, such as whether a signal is a clock signal, a data signal (e.g., latch driven signal), or a constant; a type of clock, such as a level, pulse, or delayed clock and inverted versions of each; and a phase of data, such as leading, trailing, or a combination.

As mentioned earlier, a phase type 532 is a generalized expression representing a set of waveforms 528. For example, a phase tag 536 such as "A@L" can be generalized to the phase type "C@L," which represents a set of waveforms 528 associated with a leading-phase-clocked latch clocked by any clock C. In some instances, a phase tag 536 conflates with the concept of a phase type 532.

As discussed above, more than one phase type 532 can be represented by identical CWSSs 516. Phase type groups 520 can distinguish phase types 532 that are represented by identical CWSSs 516. Phase type groups 520 can also be implemented to distinguish among classes of signals, such as clock signals, data signals, and combinations of clock and data signals. Phase expressions 548 can be comprised of mode expressions 540 and MIPES 544. A mode expression 540 is a Boolean function with a mode as its argument.

Figure 6:
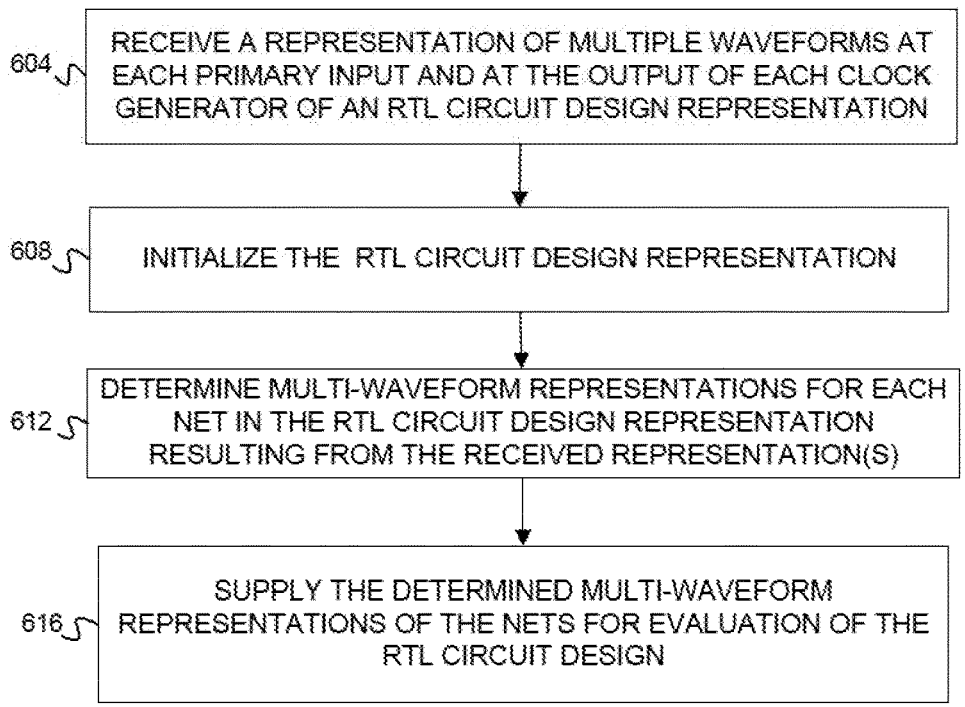
FIG. 6 is a flowchart of example operations for initializing an RTL circuit design representation of phase algebra based evaluation and propagation of compact multi-waveform representations throughout the design representation.

FIG. 6 is a flowchart of example operations for initializing an RTL circuit design representation of phase algebra based evaluation and propagation of compact multi-waveform representations throughout the design representation. At block 604, a representation of multiple waveforms is received at each primary input and at the output of each clock generator of an RTL circuit design representation. For instance, a phase tag or phase expression is associated with a primary input of an RTL circuit design representation. At block 608, the RTL circuit design representation is initialized to prepare the RTL circuit design representation to accept propagated multi-waveform representations. The initialization marks nets for propagation operations. At block 612, the multi-waveform representations are determined for each of the nets in the RTL circuit design resulting from the received multi-waveform representation. For example, operators are applied to determine output phase tags based on the various circuit components modeled in the RTL circuit design representation. At block 616, the determined multi-waveform representations are supplied for evaluation of the RTL circuit design.

Figure 7:
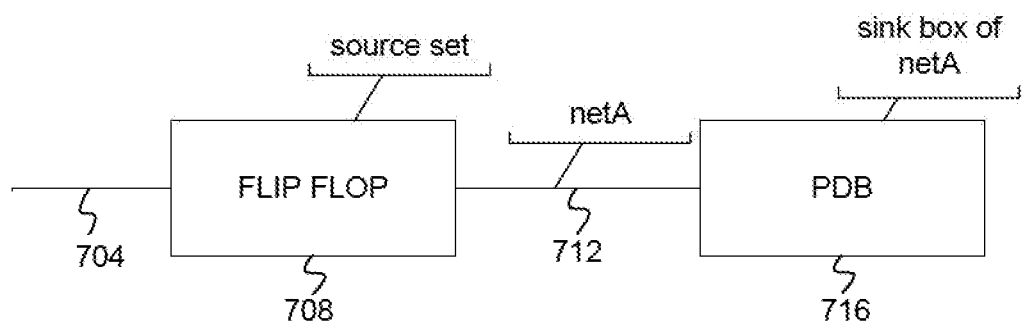
FIG. 7 illustrates terminology associated with the example propagation algorithm and pseudocode to be described.

FIG. 7 illustrates terminology associated with the example propagation algorithm and pseudocode to be described. A flip-flop 708 and path delay block (PDB) 716 are referred to as boxes. The connectors 704, 712 represent nets. The boxes 708, 716 can also be referred to as nodes. The connector 704 is the input net to a flip-flop 708, and the connector 712 ("netA") is both the output net from the flip-flop 708 and the input net to the PDB 716. The propagation algorithm determines an output phase id, which will appear at netA 712. PDB 716 can be referred to as the sink box of netA 712. In one embodiment, a source set and an update set can be established. The source set and update set can be data structures that store information about the status of each box in a circuit design representation. For example, the source set might include boxes that are to be processed by the current iteration of the propagation algorithm. The update set can include boxes that are to be processed by the next iteration of the propagation algorithm. The propagation algorithm is further described in the U.S. Provisional Patent Application, Ser. No. 61/912,345. The propagation algorithm is also described in the U.S. patent application Ser. No. 14/327,658.

Figure 8:
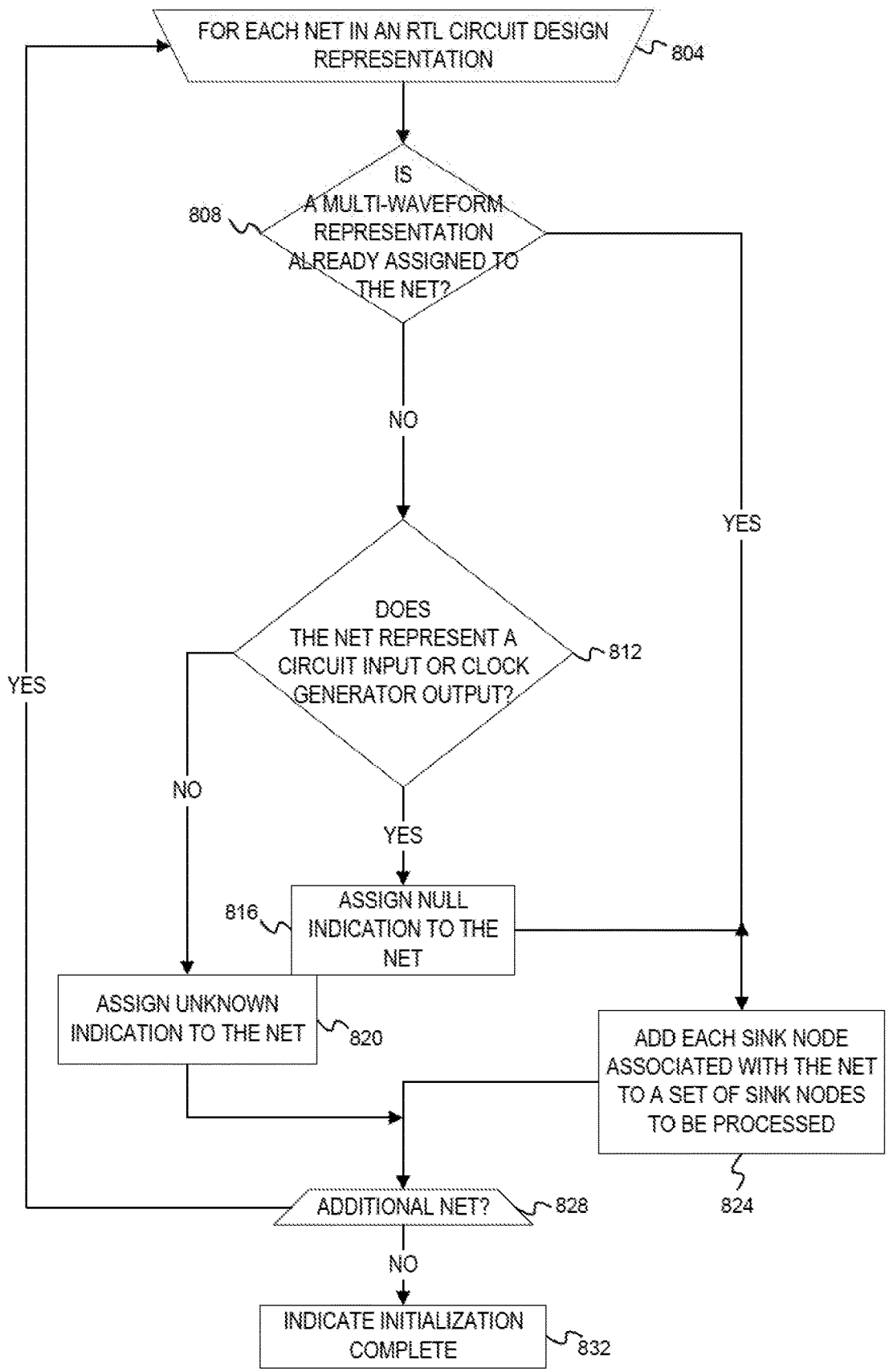
FIG. 8 is a flowchart of example operations for initializing a circuit design representation for phase algebra based evaluation.

FIG. 8 is a flowchart of example operations for initializing a circuit design representation for phase algebra based evaluation. At block 804, a loop of operations begins for each net in an RTL circuit design representation. The operations in the loop are represented by blocks 808, 812, 816, 820, and 824. Block 828 is check for a termination condition for the loop. At block 808, it is determined whether a multi-waveform representation is already assigned to the net. If a multi-waveform representation is not already assigned to the net, the flow proceeds to block 812. Otherwise, the flow proceeds to block 824. At block 812, it is determined whether the net represents a circuit input or a clock generator output. If the net represents a circuit input or clock generator output, then the flow proceeds to block 816. Otherwise, the flow proceeds to block 820. At block 816, a null indication is assigned to the net, and the flow proceeds to block 824. At block 824, each sink node associated with the net is added to a set of sink nodes to be processed. At block 820, an unknown indication is assigned to the net. The flow proceeds to block 828. At block 828, it is determined whether there exist any additional nets in the circuit design representation. If additional nets exist in the circuit design representation, then the flow returns to block 804. Otherwise, the flow proceeds to block 832. At block 832, an indication that initialization is complete is generated.

Figure 9:
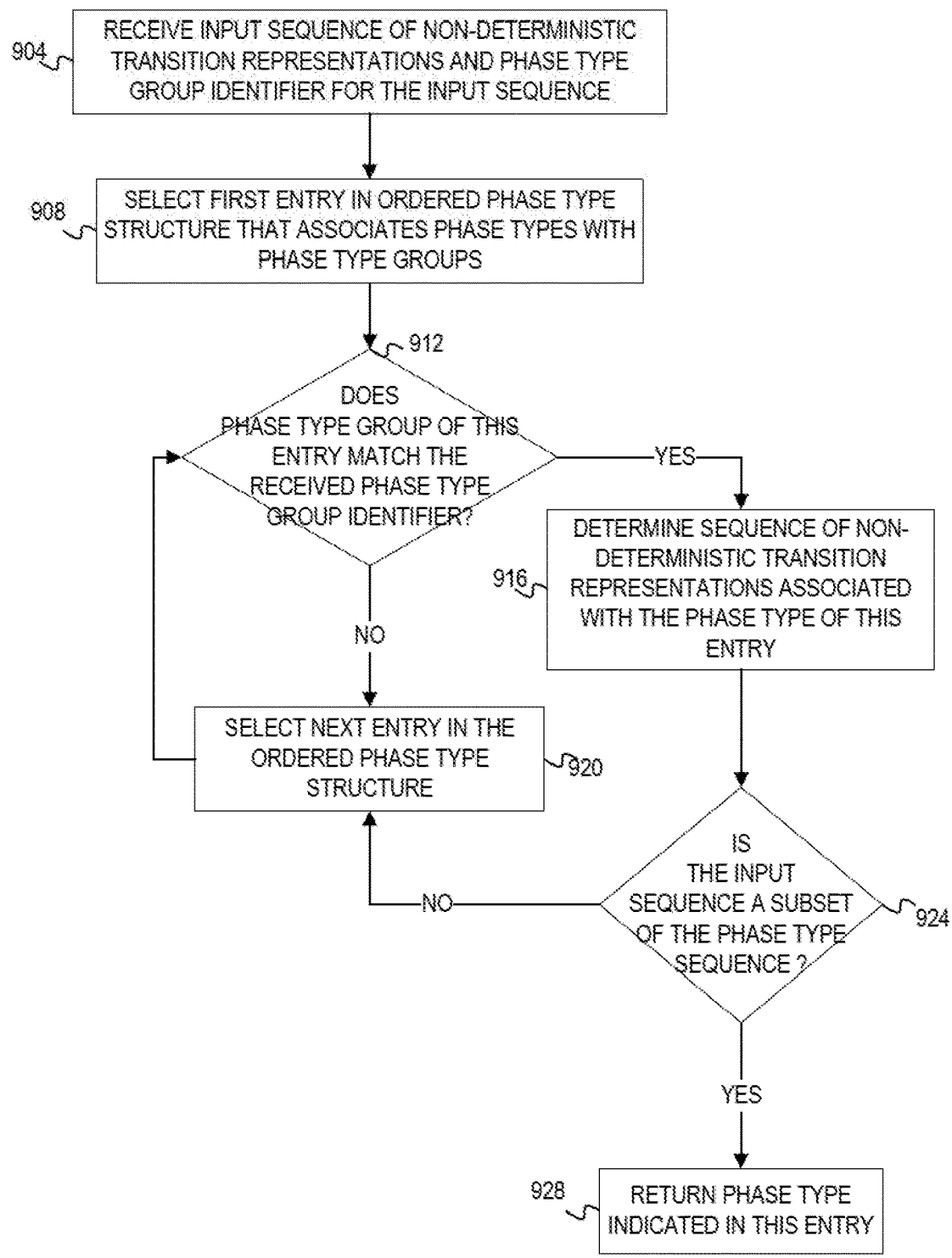
FIG. 9 is a flowchart of example operations for determining an output multi-waveform representation based on an input sequence of nondeterministic transition representations.

As discussed earlier, higher level data constructs (e.g., phase tag) are decomposed into lower level data constructs (e.g., NTFs) in order to apply operations of circuit components modeled in the circuit design representation. These operations often yield a sequence of NTFs or a CWSS that is converted back into a phase type in order for propagation to continue or determine an output to associate with a net for later defect analysis. FIG. 9 is a flowchart of example operations for determining an output multi-waveform representation based on an input sequence of nondeterministic transition representations. At block 904, an input sequence of nondeterministic transition representations and a phase type group identifier for the input sequence is received. At block 908, the first entry in an ordered phase type structure is selected that associates phase types with phase type groups. At block 912, it is determined whether the phase type group of the entry matches the received phase type group identifier. If the foregoing is false, then the flow proceeds to block 920. Otherwise, the flow proceeds to block 916. At block 920, the next entry in the ordered phase type structure is selected, and the flow returns to block 912. At block 916, a sequence of nondeterministic transition representations associated with the phase type of the entry is determined. The flow proceeds to block 924 from block 916. At block 924, it is determined whether the input sequence is a subset of the phase type sequence. If the foregoing is false, then the flow returns to block 920. Otherwise, the flow proceeds to block 928. At block 928, the phase type indicated in the entry is returned. Embodiments may utilize additional logical constructs for analysis based on various groupings. For instance, an additional logical construct can be employed to group together certain phase type groups. The pseudocode below employs such a construct and refers to it as a meta phase type group.

Figure 10:
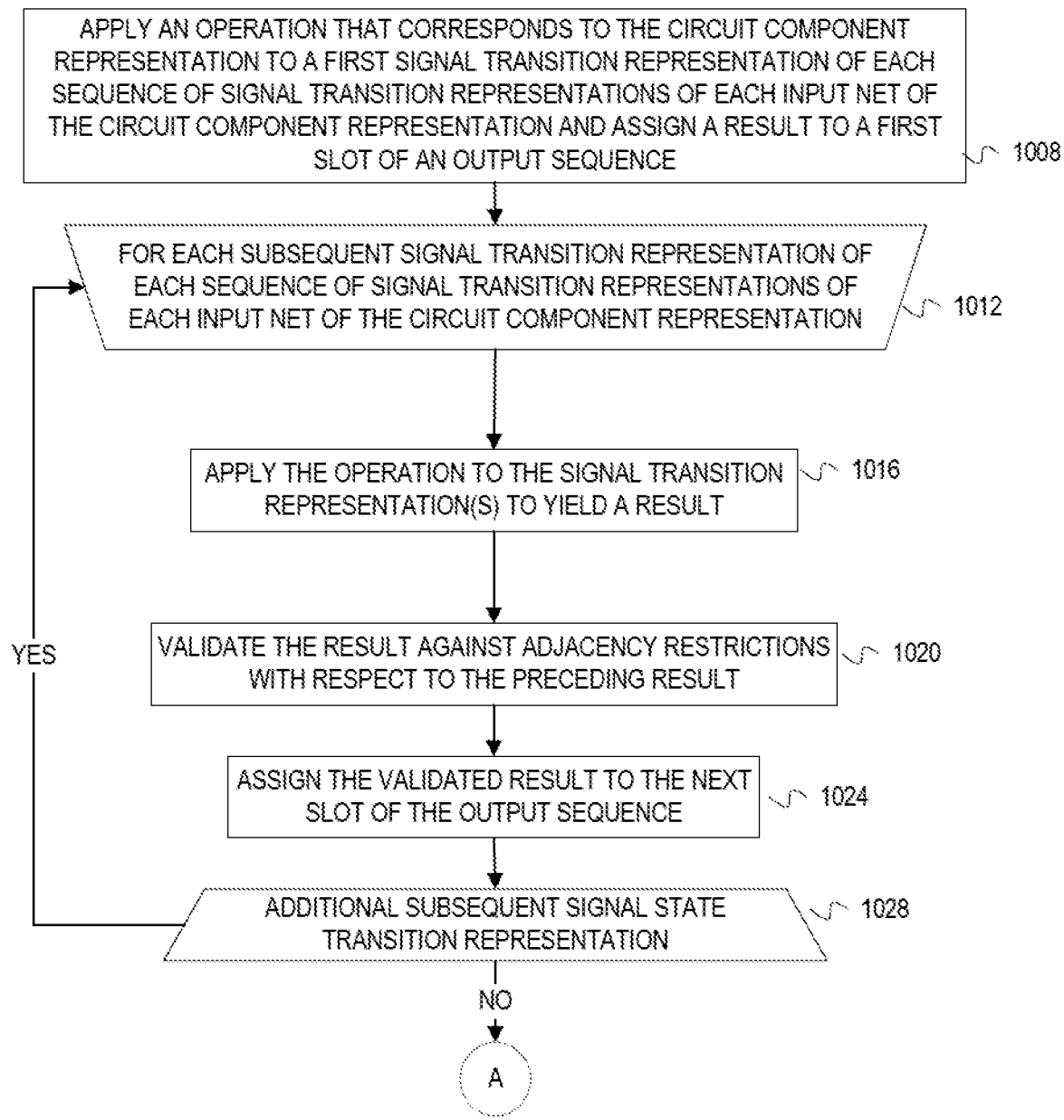
FIGS. 10 and 11 are flowcharts of example operations for applying circuit component based operations to sequences of signal transition representations.
Figure 11:
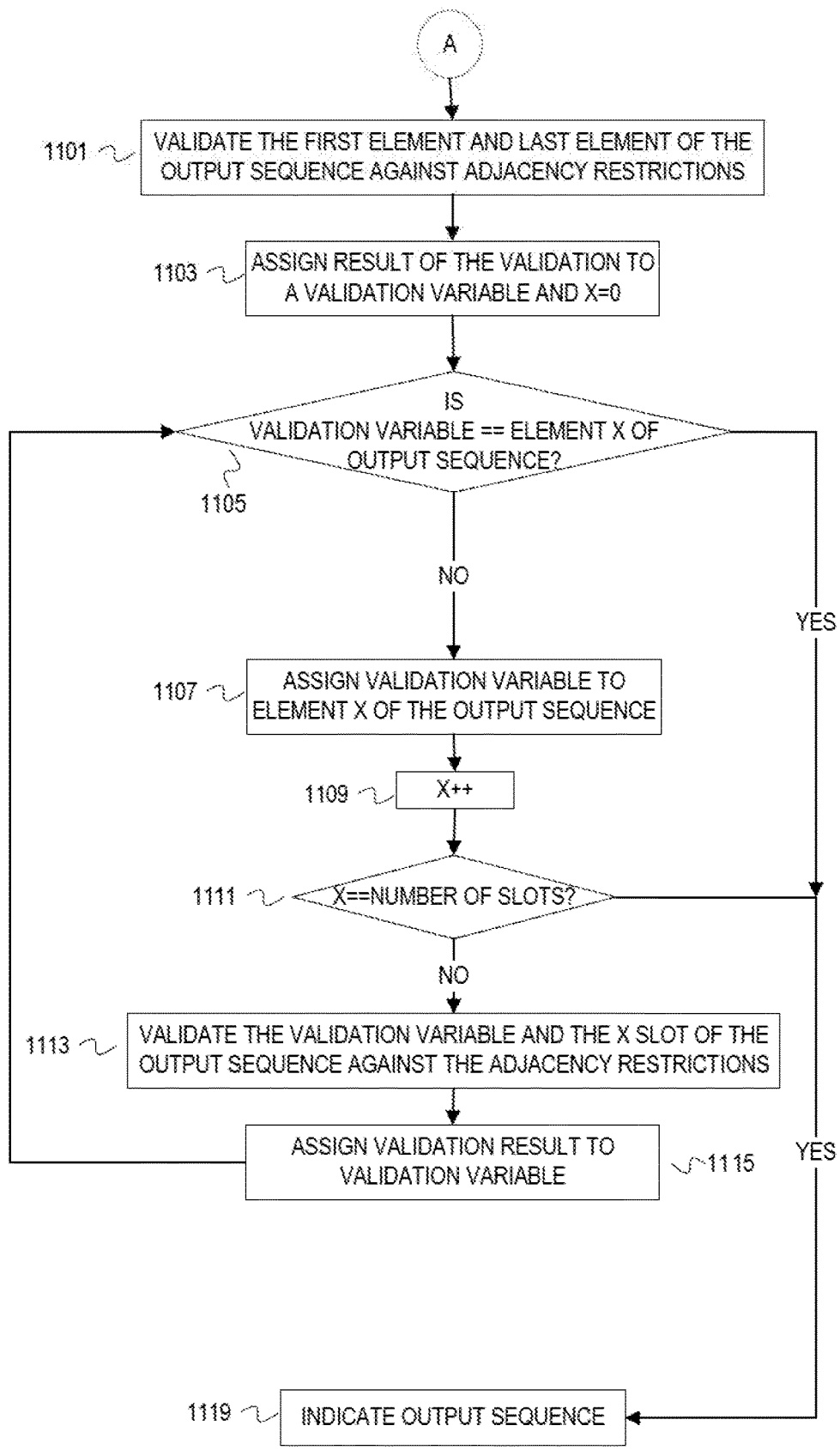

FIGS. 10 and 11 are flowcharts of example operations for applying circuit component based operations to sequences of signal transition representations. For instance, the evaluation tool applies an operation for an AND component, an operation for an XOR component, etc. Examples of the component based operators include the CWSS operators cwss_and, cwss_xor, cwss_trans_latch, and cwss_trans_latch_const. As the evaluation tool analyzes each circuit component representation of the circuit design representation, the evaluation tool invokes program code corresponding to the circuit component representation. When the program code is invoked, the operations begin at block 1008.

At block 1008, an operation that corresponds to the circuit component representation is applied to a first signal transition representation of each sequence of signal transition representations of each input net of the circuit component representation. The result of applying the operation that corresponds to the component is assigned to a first slot of an output sequence. For example, if a circuit component is an AND gate, the NTF operator ntf_and can be invoked. The ntf_and operator receives a first NTF and a second NTF associated with the first slot of each CWSS that is an input to input nets of the AND gate. The result of applying the foregoing can be assigned to the first slot of an output sequence. For instance, the result of applying the ntf_and operator to the first NTF associated with each input CWSS can be applied to the first slot of the output CWSS sequence. The flow proceeds to block 1012.

At block 1012, a process that iterates through each subsequent signal transition representation of each sequence of each input net begins.

At block 1016, the operation is applied to the signal transition representations to yield a result. For instance and continuing with the AND gate example, the process iterates through the second through eighth slot of each input CWSS applied to the AND gate, invoking the ntf_and operator. The flow proceeds to block 1020.

At block 1020, the results of the block 1016 are validated against adjacency restrictions. For example, each output NTF can be validated to confirm that such output NTF conforms to the NTF adjacency restrictions. If it does not conform, then the NTF is adjusted.

At block 1024, the validated result is assigned to the next slot of the output sequence. For example, a validated output NTF can be assigned to the appropriate output CWSS slot.

At block 1028, it is determined whether there exist additional subsequent signal transition representations to process. If any additional subsequent signal transition representations remain, then the process returns to block 1012. Otherwise, the flow proceeds to block 1101 in FIG. 11. At block 1101, the first element and last element of the output sequence are validated against adjacency restrictions. The flow proceeds to block 1103.

At block 1103, the results of the validation are assigned to a validation variable and an index X is set equal to 0. The index X is used to progress through each element of the output sequence.

At block 1105, it is determined whether the validation variable equals the element of the output sequence that corresponds to the location of the index X. If the validation variable equals the element of the output sequence that corresponds to the location of the index X, then the flow proceeds to block 1119, where the output sequence is indicated. Otherwise, the flow proceeds to block 1107.

At block 1107, the validation variable is assigned to the element of the output sequence that corresponds to the location of the index X. The flow proceeds to block 1109.

At block 1109, the index X is incremented. The flow proceeds to block 1111.

At block 1111, it is determined whether the index X has reached the end of the output sequence by testing whether X equals the number of slots. If the foregoing is true, then the flow proceeds to block 1119 at which the output sequence is indicated. Otherwise, the flow proceeds to block 1113.

At block 1113, the validation variable and the slot of the output sequence that corresponds to the location of the index X are validated against the adjacency restrictions. The flow proceeds to block 1115.

At block 1115, the validation result is assigned to the validation variable. The flow returns to block 1105 from block 1115.

Figure 12:
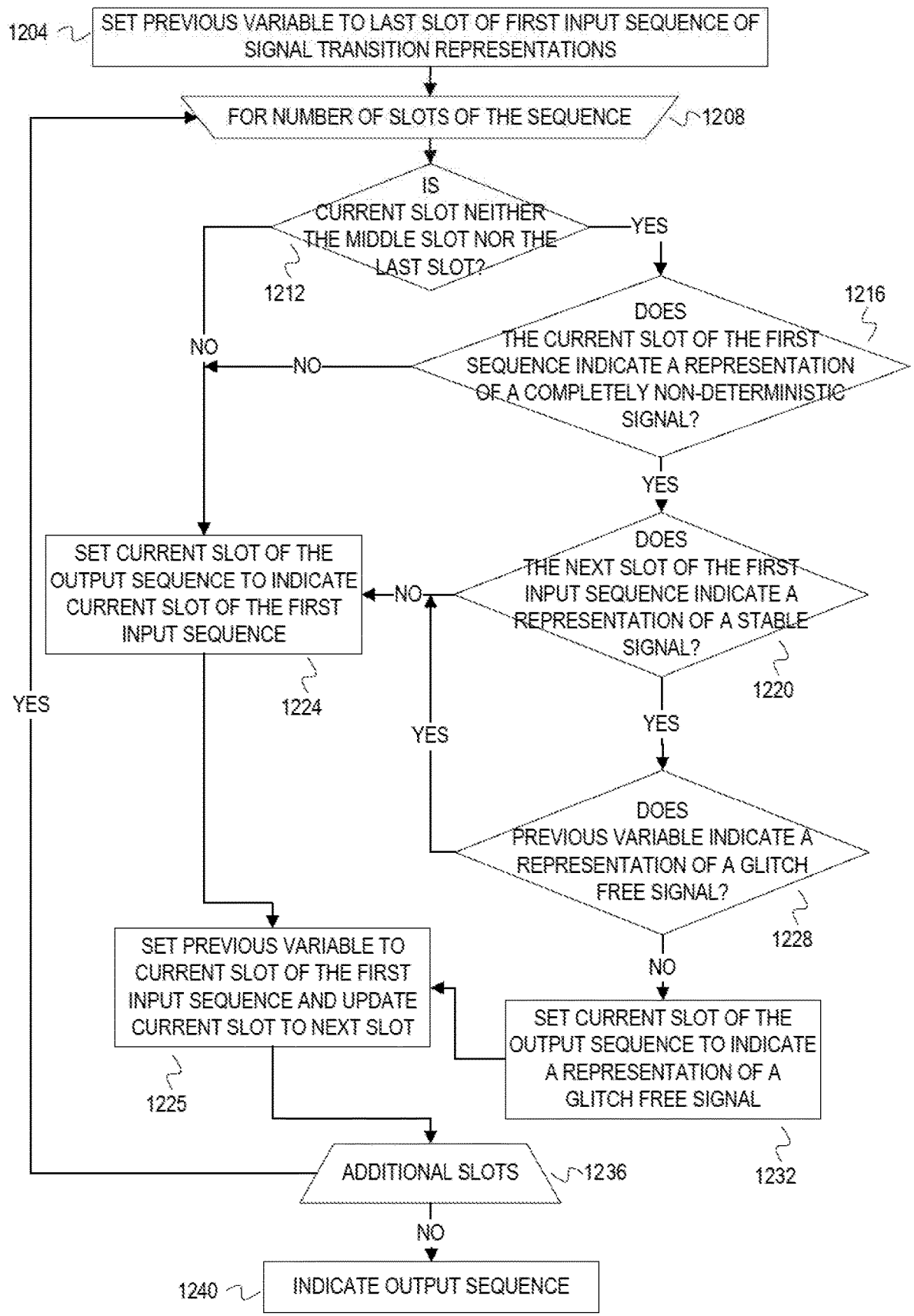
FIG. 12 is a flowchart of example operations for implementing the cwss_fix_latch operator.

FIG. 12 is a flowchart of example operations for implementing the cwss_fix_latch operator. At block 1204, a previous variable is set to the last slot of the first input sequence of the signal transition representations.

At block 1208, a control block iterates through each slot of the sequence.

At block 1212, it is determined whether the current slot is neither the middle slot nor the last slot. If the current slot is neither the middle slot nor the last slot, the flow proceeds to block 1216. Otherwise, the flow proceeds to block 1224.

At block 1216, it is determined whether the current slot of the first sequence indicates a representation of a completely nondeterministic signal. If the foregoing is true, then the flow proceeds to block 1220. Otherwise, the flow proceeds to block 1224.

At block 1220, it is determined whether the next slot of the first input sequence indicates a representation of a stable signal. If the foregoing is true, then the flow proceeds to block 1228. Otherwise, the flow proceeds to block 1224.

At block 1228, it is determined whether the previous variable indicates a representation of a glitch free signal. If the foregoing is true, then the flow proceeds to block 1224. Otherwise, the flow proceeds to block 1232.

At block 1224, the current slot of the output sequence is set to indicate the current slot of the first input sequence.

If it was determined that the previous variable does not indicate a glitch free signal, then the current slot of the output sequence is set to indicate a representation of a glitch free signal at block 1232. From either block 1224 or block 1232, the flow proceeds to block 1225.

At block 1225, the previous variable is set to indicate the current slot of the first input sequence and the current slot is updated to the next slot. Control flows from block 1225 to block 1236.

At block 1236, it is determined whether additional slots exist. If additional slots do not exist, then the flow proceeds to block 1240, and the output sequence is indicated. Otherwise, the flow returns to block 1208.

Figure 13:
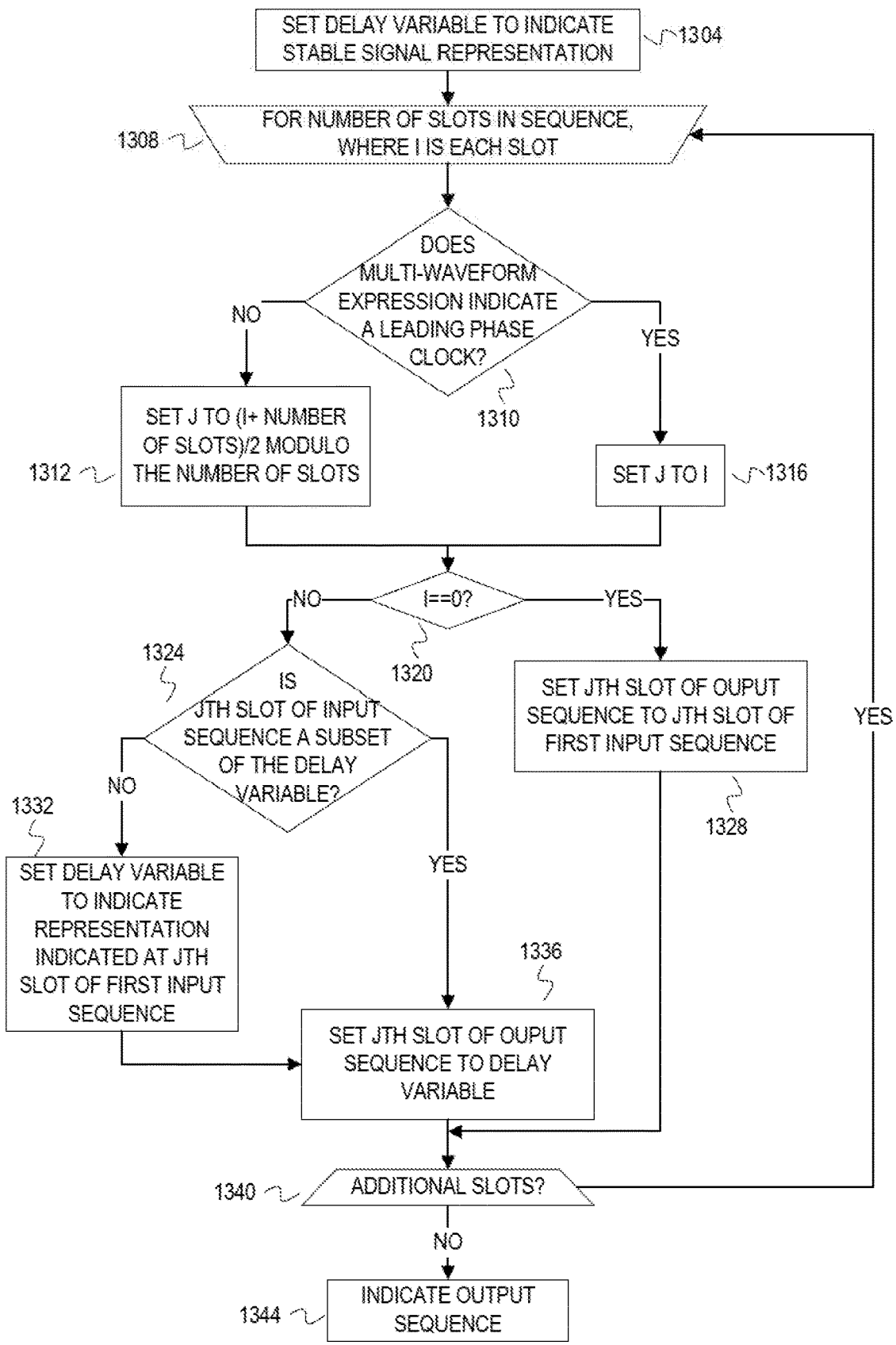
FIG. 13 is a flowchart of example operations for implementation of the cwss_path_delay operator.

FIG. 13 is a flowchart of example operations for implementation of the cwss_path_delay operator. At block 1304, a delay variable is set to indicate a stable signal representation. The flow proceeds to block 1308.

At block 1308, control block begins to iterate through each slot in a sequence of signal transition representations.

At block 1310, it is determined whether a multi-waveform expression indicates a leading phase clock. If the foregoing is false, then the flow proceeds to block 1312. Otherwise, control flows to block 1316.

At block 1312, a variable J is set to a result of (I+((total number of slots)/2)) modulo the total number of slots. I is the iterator variable, which references a slot of the sequence.

If it was determined at block 1310 that the multi-waveform expression does not indicate a leading phase clock, then the variable J is set to equal the iterator I at block 1316.

At block 1320, it is determined whether I equals zero. If I equals zero, then the flow proceeds to block 1328. At block 1328, the Jth slot of the output sequence is set equal to the Jth slot of the first input sequence. If, at block 1320, it is determined that I does not equal zero, then the flow proceeds to block 1324.

At block 1324, it is determined whether the Jth slot of the input sequence specifies a subset of the waveform transitions specified by the delay variable. If the foregoing is true, then the flow proceeds to block 1336. Otherwise, control flows to block 1332.

At block 1332, the delay variable is set to indicate the representation indicated at the Jth slot of the first input sequence. The flow proceeds to block 1336.

At block 1336, the Jth slot of the output sequence is set equal to the delay variable.

At block 1340, it is determined if there are additional slots. If there are additional slots, then the flow returns to block 1308. Otherwise, the flow proceeds to block 1344 to indicate an output sequence.

Figure 14A:
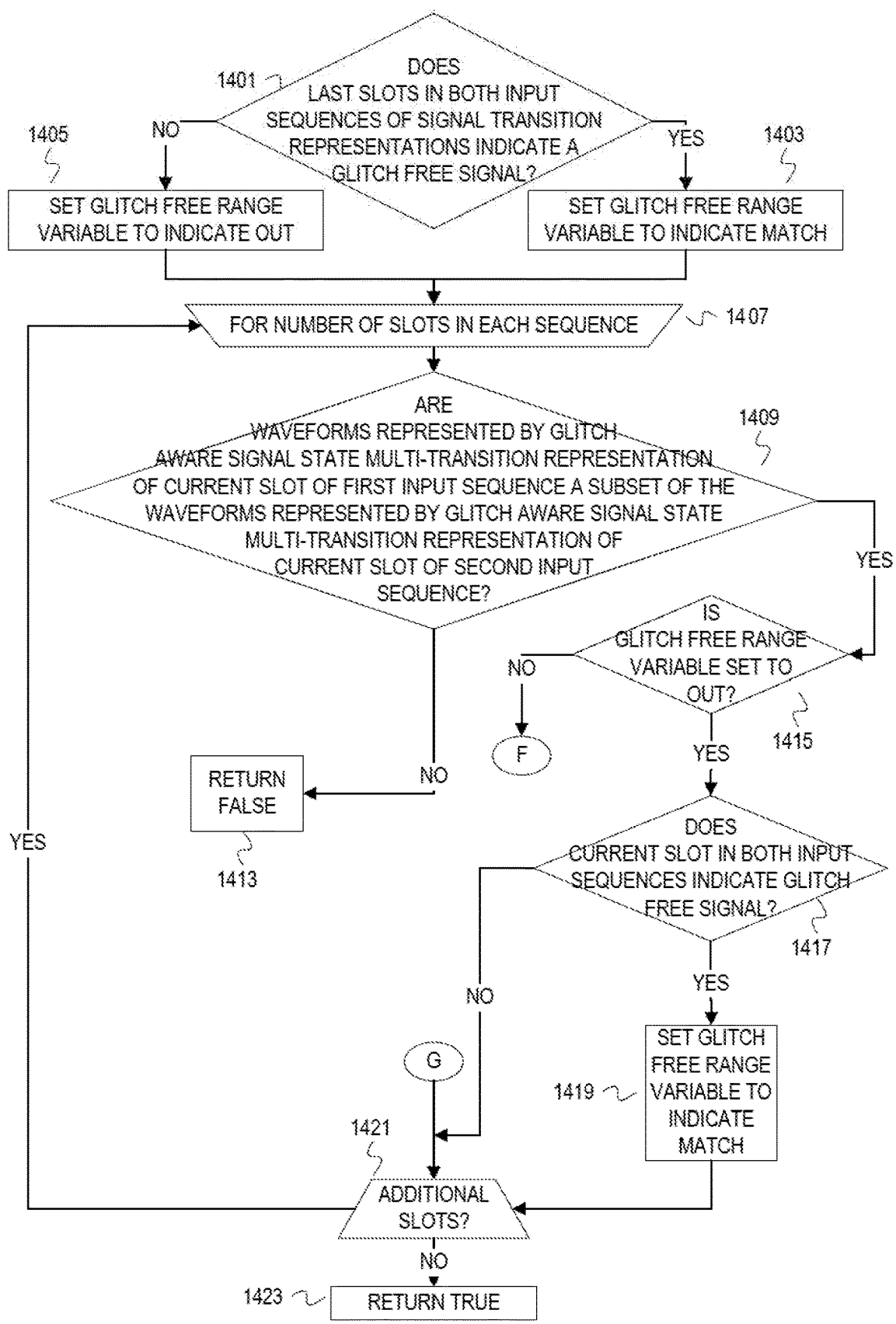
FIGS. 14A-14B depict a flowchart of example operations for implementation of the cwss_is_subset operator.
Figure 14B:
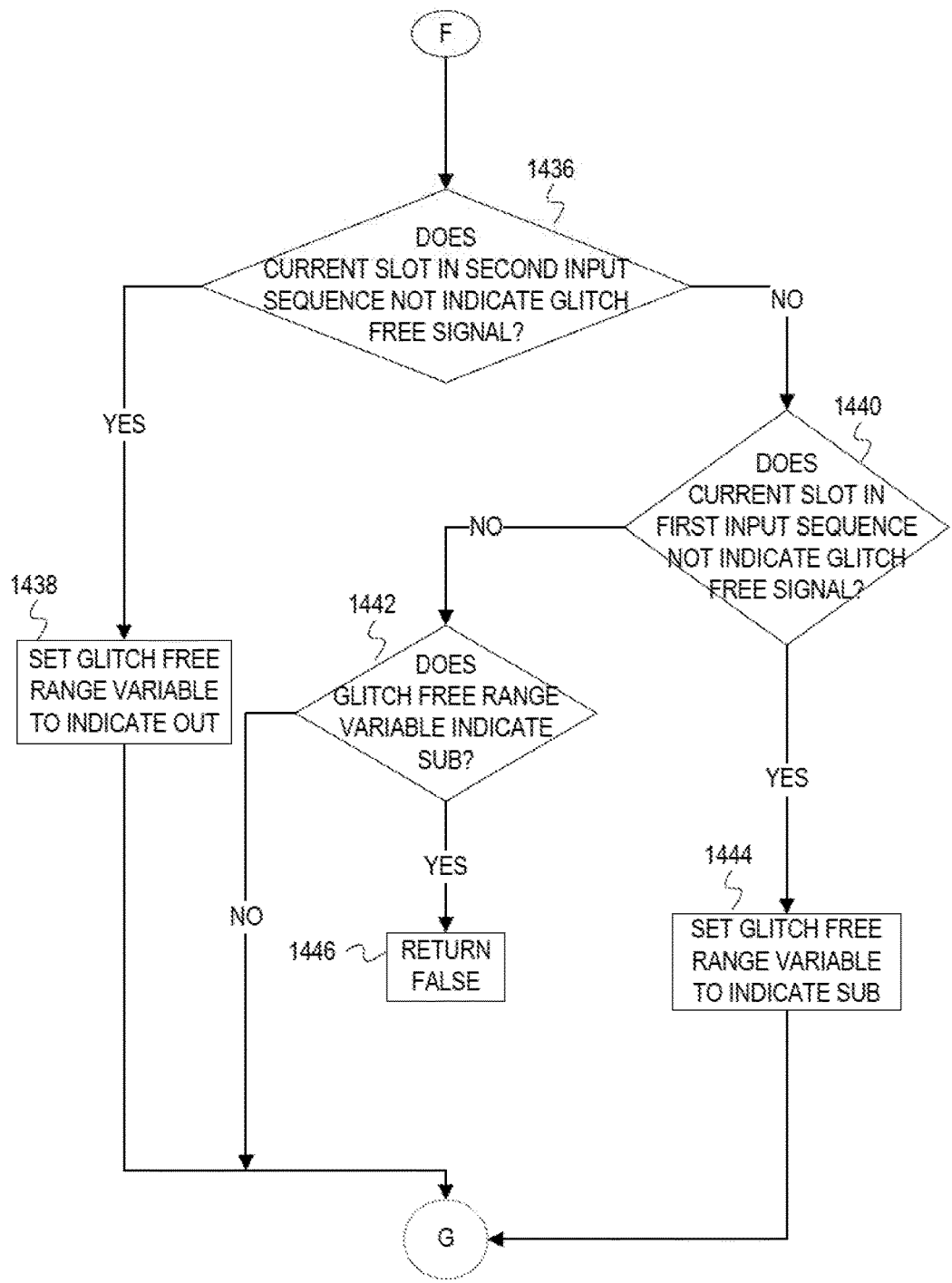

FIGS. 14A-14B depict a flowchart of example operations for implementation of the cwss_is_subset operator. At block 1401, it is determined whether the last slots in both input sequences of signal transition representations indicate a glitch free signal. If the forgoing is false, then the flow proceeds to block 1405. Otherwise, control flows to block 1403.

At block 1405, the glitch free range variable is set to a value designated OUT, which indicates that the iterator is outside a range of slots in which the first input sequence of signal transition representations and the second sequence of signal transition representations both indicate a glitch free range variable in corresponding slots.

At block 1401, if it is determined that the last slots in both input sequences of signal transition representations indicate a glitch free signal, then the flow proceeds to block 1403.

At block 1403, the glitch free range variable is set to a value designated MATCH, which indicates that first sequence of signal transition representations and the second sequence of signal transition representations both indicate a glitch free signal in corresponding slots. The flow proceeds to block 1407.

Block 1407 is control block that begins a loop of operations that iterates through each slot of the first and the second sequences of signal transition representations.

At block 1409, it is determined whether the waveforms represented by signal transition representations of the current slot of the first input sequence are a subset of the waveforms represented by signal transition representations of the current slot of a second input sequence. If the result of the foregoing is false, then the flow proceeds to block 1413 at which a value of false is returned. Conversely, if block 1409 evaluates to true, then the flow proceeds to block 1415.

At block 1415, it is determined whether the glitch free range variable is set to a value of OUT. If the forgoing is true, then the flow proceeds to block 1417. Otherwise, the flow proceeds to block 1436.

At block 1417, it is determined whether the current slot in both input sequences indicates a glitch free signal. If the foregoing is true, then the flow proceeds to block 1419 at which the glitch free range variable is set to a value of MATCH, and the flow proceeds to block 1421, where it is determined whether additional slots remain to be processed. Otherwise, the flow proceeds to block 1421.

At block 1436, it is determined whether the current slot in the second input sequence does not indicate a glitch free signal. If the foregoing is true, then the flow proceeds to block 1438. Otherwise, the flow proceeds to block 1440.

At block 1438, the glitch free range variable is set to a value of OUT, and the flow proceeds to block 1421. At block 1421, it is determined whether additional slots remain. If there are additional slots, then the process returns to block 1407. Otherwise, the flow proceeds to block 1423, at which a value of true is returned.

At block 1440, it is determined whether the current slot in the first input sequence does not indicate a glitch free signal. If the foregoing is true, then the flow proceeds to block 1444. Otherwise, the flow proceeds to block 1442. At block 1444, the glitch free range variable is set to a value of SUB. The value SUB designates that, within a range of slots in which the first input sequence of signal transition representations and the second input sequence of signal transition representations both initially contained a glitch free signal, there exists a subrange in which only the second input sequence of signal transition representations contains a glitch free signal. If the statement at block 1440 evaluates to false, then the flow proceeds to block 1442.

At block 1442, it is determined whether the glitch free range variable indicates a value of SUB. If the foregoing is true, then a value of false is returned at block 1446. Otherwise, the flow proceeds to block 1421.

Figure 15:
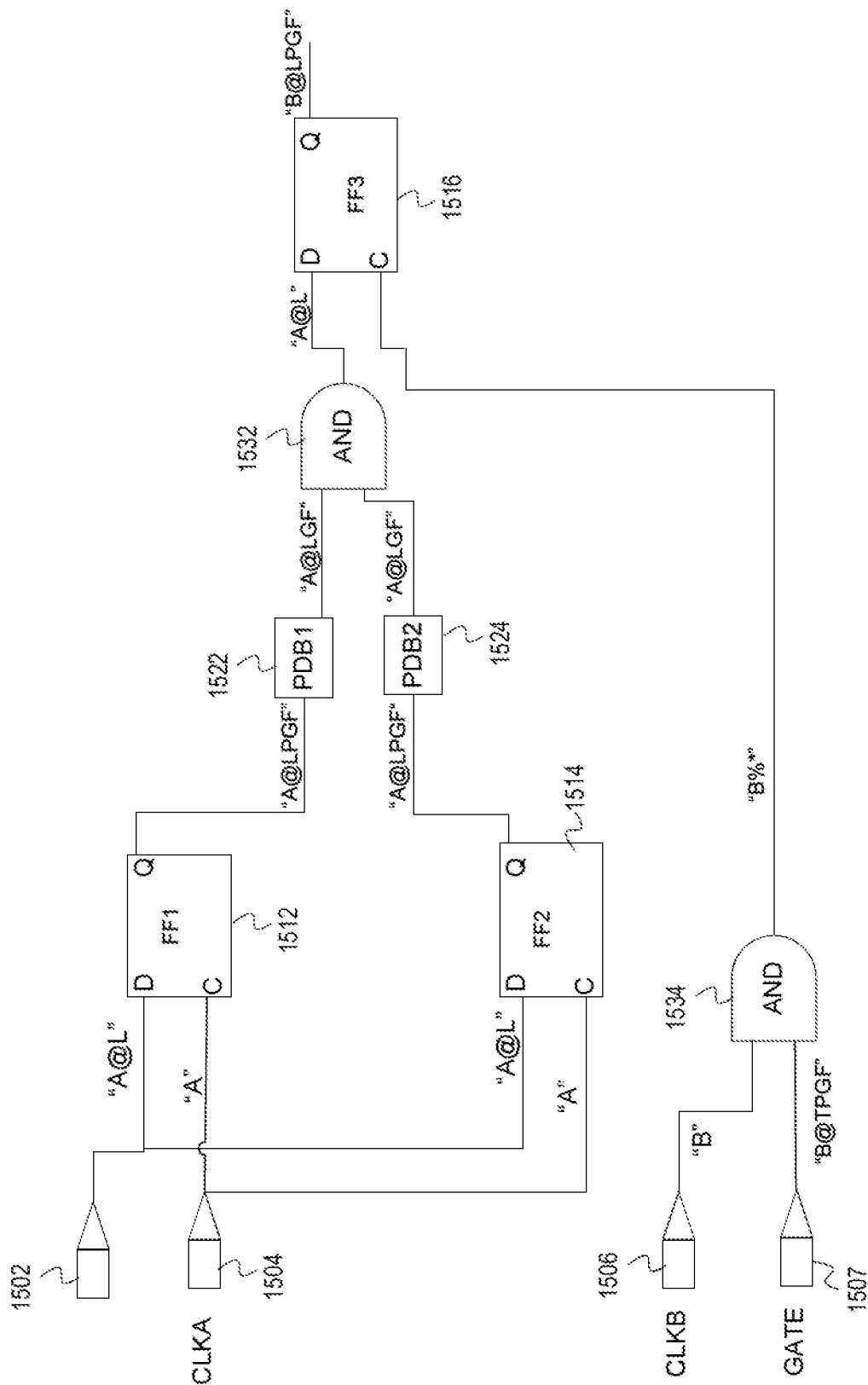
FIG. 15 is a depiction of circuit design evaluation with example phase tags.

FIG. 15 is a conceptual depiction of circuit design evaluation that shows generalized phase tag propagation. The design includes primary inputs 1502, 1504, 1506, and 1507 to the design. The primary inputs 1504 and 1506 can be generated by external clocks referred to as CLKA and CLKB, respectively.

The design includes three flip-flops 1512, 1514, and 1516. Each flip-flop 1512, 1514, and 1516 can be comprised of two transparent latches and an inverter. The design includes two path delay blocks 1522 and 1524 to model signal propagation delays. The design also includes AND gates 1532 and 1534.

The evaluation tool can convert the schematic into a netlist. The nodes of the netlist correspond to the circuit components of FIG. 15. In one embodiment, a user can provide the phase tags "A@L", "A", "B", and "B@TPGF" as inputs to a general purpose computer executing a software embodiment of the disclosure.

A propagation process can begin application of phase tag operators, as further described in the U.S. Provisional Patent Application, Ser. No. 61/912,345. Since the circuit component associated with box 1512 is a flip-flop, in one embodiment, the flip-flop phase tag operator is invoked. The flip-flop phase tag operator takes two phase tag inputs, "A@L" and "A." The phase tag operator associated with a flip-flop invokes the phase type operator associated with a flip-flop. The result of the phase type operator associated with a flip-flop is a phase type "C@LPGF". The phase tag operator converts a phase type result to a corresponding phase tag "A@LPGF" at the output net associated with the flip-flop. Similarly, the propagation algorithm updates the value at the PDB1 1522 output net. The propagation algorithm generates the value at the output net of the PDB1 1522 with the operators associated with the PDB circuit component. The PDB2 1524 is similarly processed. It is noted that the PDB1 and PDB2 elements are implemented using glitch aware algebra. Furthermore, a phase tag operator associated with an AND gate invokes the phase type operator associated with an AND gate, updating a value at the AND 1534 output net to "B %*".

As will be appreciated by one skilled in the art, aspects of the present disclosure may be embodied as a system, method or computer program product. Accordingly, aspects of the present inventive subject matter may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16:
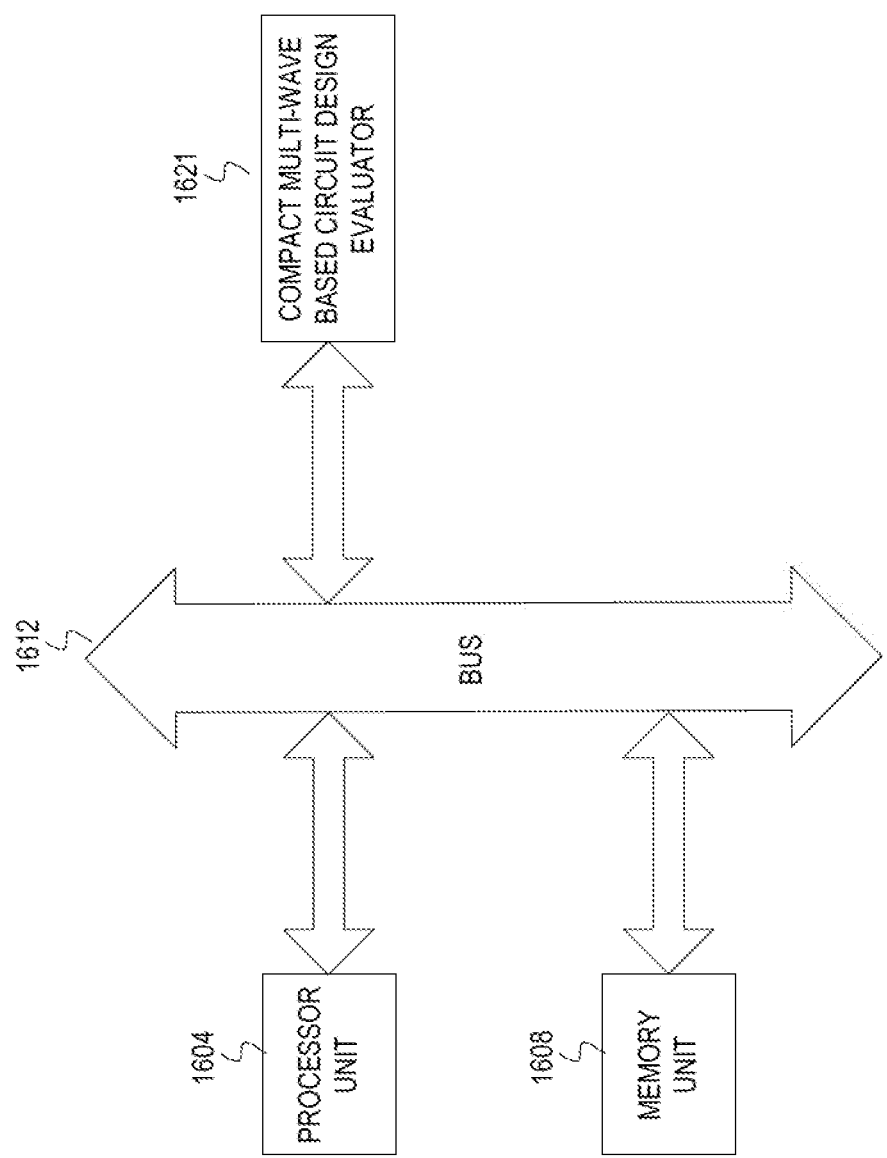
FIG. 16 depicts an example computer system compact multi-wave based circuit design evaluator.

FIG. 16 depicts an example computer system compact multi-wave based circuit design evaluator. A computer system includes a processor unit 1604 (possibly including multiple processors, multiple cores, multiple nodes, and/or implementing multi-threading, etc.). The computer system includes a memory unit 1608. The memory unit 1608 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1612 (e.g., PCI bus, ISA bus, PCI-Express bus, HyperTransport® bus, InfiniBand® bus, NuBus, etc.). The computer system also includes a compact multi-wave based circuit design evaluator ("evaluator") 1621. The evaluation tool propagates compact representations of multiple waveforms throughout nets of a register level circuit design representation as previously described. The memory unit 1608 may include one or more functionalities that facilitate storing the look-up tables or other data structures for evaluating a circuit design representation based on representations of multiple waveforms and decomposition of compact multi-waveform representations into sequence of nondeterministic signal transition representations. Any one of these functionalities may be partially (or entirely) implemented in hardware and/or on the processor unit 1604. For example, the functionality may be implemented with an application specific integrated circuit, in logic implemented in the processor unit 1604, in a co-processor on a peripheral device or card, etc. The processor unit 1604 and the memory unit 1608 are coupled to the bus 1612. Although illustrated as being coupled to the bus 1612, the memory unit 1608 may be coupled to the processor unit 1604.

While the embodiments are described with reference to various implementations and exploitations, it will be understood that these embodiments are illustrative and that the scope of the inventive subject matter is not limited to them. In general, techniques for evaluating a register level circuit design representation with compact multi-waveform representations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
Determining, with an evaluation tool run on a processor unit of a computer system, an input sequence of signal transition representations associated with an input net of an indicated component in a register transfer level circuit design stored in a memory unit of the computer system, wherein:
each signal transition representation represents a non-deterministic transition from a previous signal state to a set of at least one possible signal state; and
determining the input sequence of signal transition representations comprises determining that the input sequence of signal transition representations indicates an input gated clock waveform; and
determining, with the evaluation tool, based on the indicated component and on the input gated clock waveform, an output sequence of signal transition representations derived from the input sequence of signal transition representations, wherein:
determining the output sequence of signal transition representations comprises determining, with the evaluation tool, whether at least one signal transition representation of the output sequence of signal transition representations indicates an output gated clock waveform; and
determining, with the evaluation tool, whether the output sequence of signal transition representations conforms to restrictions that restrict which signal transition representations can be adjacent to other signal transition representations.

2. The method of claim 1, wherein determining that the input sequence of signal transition representations indicates the input gated clock waveform comprises determining a type of the input gated clock waveform selected from the group consisting of: a low gated clock waveform, a high gated clock waveform; and a double gated clock waveform.

3. The method of claim 1, further comprising:
associating, with the evaluation tool, the output sequence of signal transition representations with an output net of the indicated component if the output sequence of signal transition representations conforms to the restrictions; and modifying, with the evaluation tool, the output sequence of signal transition representations to conform to the restrictions if the output sequence of signal transition representations does not conform to the restrictions and associating the modified output sequence of signal transition representations with the output net.

4. The method of claim 1, wherein said determining the output sequence of signal transition representations comprises applying an operation that represents a behavior of the indicated component.

5. The method of claim 4, wherein applying the operation that represents the behavior of the indicated component comprises:

determining, with the evaluation tool, that one of two inputs to the operation include a gated clock input; and substituting, with the evaluation tool, the gated clock input with an ungated clock input prior to determining a result of the operation.

6. The method of claim 4, wherein applying the operation that represents the behavior of the indicated component comprises:

determining, with the evaluation tool, that two inputs to the operation include a clock type input and an unknown type input; and substituting, with the evaluation tool, the unknown type input with an unknown constant type input prior to determining a result of the operation.

7. The method of claim 4, wherein applying the operation that represents the behavior of the indicated component comprises:

determining, with the evaluation tool, that two inputs to the operation include a clock type input and a latch type input; and substituting, with the evaluation tool, the latch type input with an unknown constant type input prior to determining a result of the operation.

8. The method of claim 4, wherein applying the operation that represents the behavior of the indicated component comprises:

determining, with the evaluation tool, that two inputs to the operation include a first gated clock type input and a second gated clock type input, respectively;

substituting, with the evaluation tool, a corresponding ungated clock type input for each of the two inputs; and determining a result of the operation based, at least in part, on the two inputs to the operation prior to the substitution and on the two inputs to the operation after the substitution.

9. The method of claim 8, wherein the first gated clock type input is different from the second gated clock type input.

10. A method comprising:

determining, with an evaluation tool run on a processor unit of a computer system, an input sequence of signal transition representations associated with an input net of an indicated component in a register transfer level circuit design stored in a memory unit of the computer system, wherein:

each signal transition representation represents a non-deterministic transition from a previous signal state to a set of at least one possible signal state; and determining the input sequence of signal transition representations comprises determining that the input sequence of signal transition representations indicates an input gated clock waveform; and determining, with the evaluation tool, based on the indicated component and on the input gated clock waveform, an output sequence of signal transition representations derived from the input sequence of signal transition representations, wherein:

determining the output sequence of signal transition representations comprises:

determining, with the evaluation tool, whether at least one signal transition representation of the output sequence of signal transition representations indicates an output gated clock waveform; and applying an operation that represents a behavior of the indicated component, the applying including determining, with the evaluation tool, that one of two inputs to the operation include a gated clock input, and substituting, with the evaluation tool, the gated clock input with an ungated clock input prior to determining a result of the operation; and determining, with the evaluation tool, whether the output sequence of signal transition representations conforms to restrictions that restrict which signal transition representations can be adjacent to other signal transition representations.

11. The method of claim 10, wherein determining that the input sequence of signal transition representations indicates the input gated clock waveform comprises determining a type of the input gated clock waveform selected from the group consisting of: a low gated clock waveform, a high gated clock waveform; and a double gated clock waveform.

12. The method of claim 10, wherein applying the operation that represents the behavior of the indicated component comprises:

determining, with the evaluation tool, that two inputs to the operation include a clock type input and an unknown type input; and substituting, with the evaluation tool, the unknown type input with an unknown constant type input prior to determining a result of the operation.

13. The method of claim 10, wherein applying the operation that represents the behavior of the indicated component comprises:

determining, with the evaluation tool, that two inputs to the operation include a clock type input and a latch type input; and substituting, with the evaluation tool, the latch type input with an unknown constant type input prior to determining a result of the operation.

14. The method of claim 10, wherein applying the operation that represents the behavior of the indicated component comprises:

determining, with the evaluation tool, that two inputs to the operation include a first gated clock type input and a second gated clock type input, respectively;

substituting, with the evaluation tool, a corresponding ungated clock type input for each of the two inputs; and determining a result of the operation based, at least in part, on the two inputs to the operation prior to the substitution and on the two inputs to the operation after the substitution.

15. The method of claim 14, wherein the first gated clock type input is different from the second gated clock type input.

16. The method of claim 10, further comprising:
determining whether the output sequence of signal transition representations conforms to restrictions that restrict which signal transition representations can be adjacent to other signal transition representations;
associating, with the evaluation tool, the output sequence of signal transition representations with an output net of the indicated component if the output sequence of signal transition representations conforms to the restrictions; and
modifying, with the evaluation tool, the output sequence of signal transition representations to conform to the restrictions if the output sequence of signal transition representations does not conform to the restrictions and associating the modified output sequence of signal transition representations with the output net.

* * * * *